(12) United States Patent
Yasukura

(10) Patent No.: US 6,990,588 B1
(45) Date of Patent: Jan. 24, 2006

(54) AUTHENTICATION CARD SYSTEM

(76) Inventor: Yutaka Yasukura, 15-22 Katutadai-minami 2-chome, achiyo-shi, Chiba 276-0025 (JP)

( * ) Notice: Subject to any disclaimer, the term of this patent is extended or adjusted under 35 U.S.C. 154(b) by 0 days.

(21) Appl. No.: 09/445,060

(22) PCT Filed: May 19, 1999

(86) PCT No.: PCT/JP99/02599

§ 371 (c)(1),
(2), (4) Date: Dec. 2, 1999

(87) PCT Pub. No.: WO99/60485

PCT Pub. Date: Nov. 25, 1999

(30) Foreign Application Priority Data

May 21, 1998 (JP) ......................... H10/139563

(51) Int. Cl.
  *H04K 1/00* (2006.01)
  *H04L 9/00* (2006.01)

(52) U.S. Cl. .................... 713/186; 713/155; 713/161
(58) Field of Classification Search ................ 713/161, 713/155, 186
See application file for complete search history.

(56) References Cited

U.S. PATENT DOCUMENTS

| | | | |
|---|---|---|---|
| 5,457,747 A | 10/1995 | Drexler et al. | 380/24 |
| 5,513,272 A | 4/1996 | Bogosian, Jr. | 382/116 |
| 6,310,966 B1 * | 10/2001 | Dulude et al. | 382/115 |
| 6,424,249 B1 * | 7/2002 | Houvener | 340/5.82 |
| 6,484,260 B1 * | 11/2002 | Scott et al. | 713/186 |
| 6,535,978 B1 * | 3/2003 | Padgett et al. | 713/156 |

FOREIGN PATENT DOCUMENTS

| | | |
|---|---|---|
| EP | 0 523 908 A | 1/1993 |
| EP | 0 762 340 A2 | 3/1997 |
| GB | 2 171 828 A | 9/1986 |
| JP | 57-055468 A | 4/1982 |
| JP | 01-224888 A | 9/1989 |
| JP | 04-160674 A | 6/1992 |
| JP | 06-259451 A | 9/1994 |

OTHER PUBLICATIONS

Ogata, Wakaha, "Q. What is a diversification of secret?" ELECTRONICS, No. 505 (vol. 41, No. 6), pp. 108–109.

Komatsu, Naohisa, "Q. Is it true that security can be protected by handwriting?" ELECTRONICS, No. 504 (vol. 41, No. 5), pp. 40–41.

* cited by examiner

*Primary Examiner*—Andrew Caldwell
*Assistant Examiner*—Courtney Fields
(74) *Attorney, Agent, or Firm*—Fleshner & Kim, LLP

(57) ABSTRACT

Biological individuality data for use in distinguishing the individuality of a user (8) are picked up, and a user authentication card (7) with at least part of the biological individuality data recorded thereon is issued. The contents of the record in the user authentication card (7) are read out by an authentication-card reader (41), and compared with biological individuality data input by the user through an identity acquisition device. Such personal authentication is directly executed at an authentication access terminal (4). The system also includes certification authorities (2), (3), each of which records part of the biological individuality data so that the certification authorities can additionally authenticate personal identification in response to inquiry from the authentication access terminal (4), thus improving the reliability. The authentication IC card used in the system is provided with a CPU, an authentication file storing identity information, and an application file classified into files according to the depth of authentication.

18 Claims, 14 Drawing Sheets

FIG.5

ISSUE OF USER AUTHENTICATION CARD

REGISTRATION OFFICE

- RECEIVE REGISTRATION APPLICATION FROM USER — S11
- INPUT BIOLOGICAL INDIVIDUALITY DATA INDICATIVE OF CHARACTERISTICS OF INDIVIDUAL USER — S12
- SEND REGISTRATION APPLICATION AND BIOLOGICAL INDIVIDUALITY DATA TO POLICY REGISTRATION AUTHORITY — S13

AUTHORIZED OR POLICY REGISTRATION AUTHORITY

- PERMIT ISSUE OF AUTHENTICATION CARD AFTER PREQUALIFYING AND REGISTERING USER — S14
- DIVIDE BIOLOGICAL INDIVIDUALITY DATA OF USER AND DISTRIBUTE DIVIDED DATA TO CERTIFICATION AUTHORITY AND AUTHENTICATION-CARD ISSUING OFFICE — S15
- RECORD INFORMATION ON REMOVABLE LARGE-CAPACITY RECORDING MEDIUM — S16

AUTHENTICATION-CARD ISSUING OFFICE

- ISSUE USER AUTHENTICATION CARD ON WHICH AUTHENTICATION-CARD IDENTIFYING INFORMATION AND BIOLOGICAL INDIVIDUALITY DATA OF USER ARE RECORDED — S17

IDENTITY INFORMATION CONFIRMING PROCESS

AUTHENTICATION CARD SYSTEM

TECHNICAL FIELD

This invention relates to a user authentication system for execution of individual authentication in electronic information exchange, electronic commercial transaction and so on, a user authentication card and a user authentication device for use in the user authentication system, and a lock control system to which the user authentication system is applied and in which only the authorized persons are allowed to open or close a lock.

BACKGROUND ARTS

The kinds of information accessible through communication networks have become extremely diverse in recent years, which range from electronic commerce such as product trading or credit to on-line medical diagnoses or individual medical records, and to perusal of registered items or the issue of certificates from public offices. The application and utilization of such information is increasing for years.

Such personal information has something to do with individual's privacy, and it is often prohibited from being informed to others if there is the danger of leaking the information to public. To establish a more convenient information-based society associated with advances in electronic information communication networks, there has been a demand for a highly reliable user authentication system capable of making a clear distinction between individuals.

Such a mechanism for authenticating personal identity can also be used in a lock device to prohibit entrance of unauthorized persons into a laboratory, a business office, or a house, and for an improvement in security of electronic money.

The password has been most commonly used in authenticating user identity. The password is easy to use, but it is hard to eliminate thieves who steal the user's passwords. To prevent password thefts, the user takes care in protecting the security of password such as to use a long password, to select a password difficult to guess, or to change the password on occasion. Cryptography has also widely been used for security in communications, which encrypts communication contents to prevent others from recognizing the contents easily even when data leakage occurs.

Nevertheless, such security measures cannot be perfect, and the password may be stolen by others through wiretapping communication, cracking the encrypted code, or stealing a look at the password. Further, the more complicated the password is, the more difficult for the user to remember. It is also essential that any complicated password can be duplicated by any means as soon as the password is stored as digital data.

To prevent others from pretending the user and authenticate user identity securely, there has been considered another method of authenticating user identity based on information indicative of so-called biological individuality of the user such as a fingerprint or voiceprint. However, the biological individuality data has generally a large quantity of information, and this requires extremely dense traffic flows between an authentication access terminal and an certification authority in which the user's biological information is stored. Such dense traffic flows may cause a traffic jam in a communication channel and increase of communication time, and it is hard to apply this method to practical use except for special environments. In the method, other problems also remain with the data managing place and managing method.

In recent years, a lock control system has been widely used for security in a research center, a business office, a laboratory, a document memory room, and a house or apartment building. In the lock control system, persons permitted to enter a specific place are limited, and a lock is opened only when a card issued to authorized persons has passed in authentication.

It is also essential to authenticate personal identity accurately in the case where only the person concerned can receive services such as electronic commercial transaction as product trading or credit, on-line medical diagnoses, perusal of individual medical records or registered items from public offices, or issue of certificates. Such transactions are increasing to be conducted by accessing information through a communication network instead of face-to-face communication.

In conducting such transactions, it is necessary to judge whether the person concerned is the authentic user or not. The judgment must be accurately made without face-to-face talk. In these cases, a card can be used to authenticate personal identity, and this makes it possible to improve the reliability.

Since the level of security varies according to the type of transaction, the depth of personal authentication varies. For example, in case of a sale of cheap products, it may be required nothing but the approval of the authenticity of the card. On the other hand, in case of the issue of medical records, it may be desired to use the authenticity of the card together with biological information capable of authenticating personal identity securely such as a photograph of the face, a fingerprint, or a voiceprint.

A key card for use in lock control system or entrance control system is generally issued for each lock and the key card is to be carried or charged by the respective authorized persons. If many rooms are subject to entrance control, a highly qualified person must carry many key cards, and this makes the charge of keys complicated. On the other hand, plural qualified-persons may often share one key card with each other. In this case, unauthorized persons may easily steal and improperly use the password or the key card unless being strictly cared, and this will be more difficult to keep security.

A business card is also issued for each business transaction by the consent of all the parties, and thereby the transaction cards carried by one person tend to be enormous in number before he is aware.

The use of a card as a key is applied to other cases, for example, lockers for rent. In this case, the key is prepared for each locker and lent to the user. Since even a person other than the genuine user can open the locker by the lent key, the stored things may be stolen by others, thus the security is insufficient.

In case of safe-deposit boxes with higher security, a safe box is not unlocked by the key handed over to the user at the time of lending the safe box unless another key held by a superintendent are used together. The trouble with this system is that the superintendent must attend to unlock every safe box. In addition, a stolen or duplicated key can be used to unlock a corresponding safe box, and the security is still insufficient.

Some safe-deposit box systems provide each safe box with a dial or keyboard for entering a code to the lock. In this case, the user inputs a code at the time of locking the safe box to prohibit the safe box from being opened without inputting the same code. This makes it possible for the user to eliminate the need to carry a key. Since the user unlocks the safe box based on a code set at each use of the safe box be the user, the security is high despite its ease of use. It is nevertheless possible for others to steal a look at the code or to decipher the code by guess or trial for unlocking the safe box.

Further, there is another type of lock control system, in which entrance of persons into a laboratory, a document memory room, or a medicine memory room is limited to only the authorized persons for security. In this case, the lock is not opened unless any authorized person has passed in authenticating personal identity with a card issued to the person. However, if the card is carelessly charged or kept by a person selected in the company, unauthorized persons may possibly enter the place freely using the card.

Since the level of security varies depending on the lock to which a user accesses, a facility requiring low level security should avoid such excessively high security system as to require the user to carry out extremely complicated steps. For example, secure authentication even accompanied with complicated steps is necessary to open a memory shelf keeping deadly poisons, while easy authentication is enough for normal medicines as long as the amount of takeout is cared.

Even in case of safe-deposit boxes, the level of security varies according to the importance of stored things. For example, expensive property or valuables for which there are no substitutes differ in level of security from replaceable goods.

As for the type of card, a card with a CPU and a memory incorporated therein, such as an IC card, has been used as a credit card or electronic-cash card in recent years.

The IC card has features to conduct complicated computations required for a high level of authentication, and to easily rewrite or renew recorded contents. Such features are adequate to a card for record of details about sequential transactions one by one, or for use as electronic money.

Further, the memory capacity built in the IC card is increasing, and this makes it possible for users to carry the various personal information by carrying the card. Such personal information convenient to carry around includes an ID number of insurance deed, a user's number of credit card, a personnel card number or an individual history in the company, balance of electronic money account, details of a family register, a medical history, an address book, and so on. Such personal information has something to do with individual's privacy, and may often require its concealability.

Since such an authentication IC card authenticates personal identity based on the information recorded thereon, the security of the card is important.

It is therefore an object of the invention to provide a user authentication system that can obtain a quick response while retaining a high level of security in authenticating personal identity for electronic information exchange or electronic business transaction, and a user authentication card and a user authentication device for use in the user authentication system.

It is another object of the invention to provide an integrated authentication IC card that can combine various authentication cards issued for respective transactions for authenticating eligible persons so as to improve security in each transaction or lock system. Still another object of the invention is to provide an authentication IC card capable of assuring security of access to information stored in the IC card itself while seeking complete privacy protection.

It is yet another object of the invention to provide a lock control system offering a superior level of security, which can strictly judge an authorized person while setting the depth of authentication of the authorized person as required.

DISCLOSURE OF INVENTION

A user authentication system of the invention includes a registration station, an authentication card issuing station, an authentication access terminal, and at least one certification authority. The registration station is provided with an information acquisition device for obtaining biological individuality data for use in distinguishing the individual of users. The authentication card issuing station issues to the user a user authentication card with at least a part of the biological individuality data recorded thereon. The authentication access terminal is provided with an authentication-card reader for reading the information of the user authentication card and an identity acquisition device for obtaining biological individuality data of the user. The certification authority is connected to the authentication access terminal through an information communication channel, and holds the record of the remaining part of the biological individuality data that have obtained at the registration station but not recorded in the user authentication card. The recorded contents read out by the authentication-card reader of the authentication access terminal are compared with the biological individuality data of the user obtained on the spot through the identity acquisition device in order to authenticate identification of the user, and if a higher level of authentication is required, the certification authority compares the biological individuality data of the user obtained at the authentication access terminal with the part of the biological individuality data missing in the user authentication card and sends the comparison result to the authentication access terminal for further authentication, in response to inquiry from the authentication access terminal.

In this specification, the biological individuality data denote characters unique to an individual distinguishable from others because of the nature that cannot be controlled by human will. The biological individuality data include not only natural characteristics such as a fingerprint or palmprint, an iris or retina pattern, and DNA information, but also acquired characteristics from habit such as handwriting or a voiceprint. There may be the potential of finding other biological individuality data recognizable more easily and securely.

In the second aspect of the invention, a user authentication system includes a registration station, an authentication card issuing station, and an authentication access terminal, in which a user authentication card has a computing function. When biological individuality data are obtained at the authentication access terminal and input to the user authentication card, the computing function of the user authentication card compares the biological individuality data recorded in the user authentication card with the biological individuality data obtained on the spot through the identity acquisition device, and if required, further integrates it with the authentication result provided from an certification authority, thus authenticating the user as the true holder of the user authentication card.

The user authentication system of the second aspect of the invention preferably includes at least one certification authority connected to the authentication access terminal through an information communication channel. Most of the biological individuality data obtained at the registration station is recorded in the user authentication card, while the remaining part that has not been recorded in the user authentication card is shared to be recorded at each certification authority. It is preferable that the certification authority compares the biological individuality data of the user obtained at the authentication access terminal with the part of the biological individuality data lacked in the user authentication card in response to inquiry from authentication access terminal for further authentication.

In the user authentication system, the certification authority may be provided with a memory device for recording the biological individuality data obtained at the registration station.

In the user authentication system of the invention, the user authentication card records thereon at least a part of the biological individuality data that distinguishes the individuality of a user from others, and when the user needs to be authenticated, the biological individuality data in the user authentication card are compared with the biological individuality data input by the user on the spot, so that only the true user can pass in authentication test, thereby preventing others from pretending the user.

Not only is it too hard to reproduce the original forms of biological individuality from its digitized data, but also others cannot duplicate the biological individuality even if they can reproduce the digitized data. This makes it possible to offer a superior level of reliability of the user authentication.

In particular, since the biological individuality data for reference are recorded in the user authentication card, the user to be authenticated can be directly confirmed with his or her identity at the authentication access terminal without inquiring the identification from the certification authority remote from the authentication access terminal. This makes it possible to reduce a great deal of time and cost spent on communication with the certification authority.

If the user authentication card is provided with a computing function such as a CPU and a RAM by which biological individuality data obtained from a user who makes use of the user authentication card are input and checked with those recorded in the user authentication card, the load at the authentication access terminal and the device cost can be reduced, thereby offering an easy-to-use system. Further, the information processing can be completed inside the user authentication card to prevent the authentication data from leaking to the outside, thereby improving the security.

Further, if the biological individuality data are divided out between the user authentication card and the certification authority, the necessary information is divided, and this makes it hard for others to breaking through the entire authentication system even if the part of biological individuality data recorded in the authentication card can be reproduced from the card, for example. In addition, since the data for use in authenticating personal identification cannot be duplicated from the user authentication card only, a superior level of security can be retained. Furthermore, even if the contents of the record in the user authentication card are falsified, since the information at the certification authority is maintained, others cannot pretend to be the proper user.

The process of dividing data according to the invention is different from the conventional process in that, in stead of judging reintegrated data gathered at one place, the authentication access terminal and the certification authority independently authenticate personal identification based on the biological individuality data in hand so that both results can be reflected in the authentication. Since the entire original data are never reproduced, the concealability of the data can be maintained with a superior level of security.

Even when someone succeeds to attack the certification authority, he cannot falsify the information of the user authentication card carried by the user, thus retaining the security.

Further, in case of use of a plurality of certification authorities, each certification authority may authenticate personal identification independently in response to inquiry from the authentication access terminal or from another certification authority, in addition to the user authentication based on the information of the user authentication card. In such a case, if the certification authorities hierarchically arranged in the system obtain authentication results on step-by-step basis, the reliability of the user authentication can further be improved.

In the user authentication system of the invention, pass/fail determination may be selectively made by only the authentication result obtained by the authentication access terminal based on the information recorded in the user authentication card, or for more secure determination by adding the authentication results by the certification authority or authorities based on the information held in the authority or authorities but not recorded in the user authentication card, according to the required reliability of the authentication.

The level of authentication may be predetermined for each authentication access terminal or each transaction, or it may be set for every transaction by the authentication access terminal. Alternatively, it may be automatically selected according to the sale price or other appropriate guidelines.

Further, in this process of dividing information, even when whole biological individuality data are used for user authentication, if the authentication is executed at the authentication access terminal deriving most of the data from the user authentication card, the amount of information exchanged through the communication line can be reduced, and hence the traffic flows on the communication line and the time spent on inquiring can be reduced. The division of information has also effects on the control of processing performance and memory capacity at the certification authority which is required to store information of a large number of users and to dispose a lot of inquiries.

Furthermore, the user authentication system may include a registration authority provided with a memory device for storing biological individuality data of the user obtained at the registration station. The registration authority holds the full records of the biological individuality data of the user obtained at the registration station for use in judging the place where unauthorized use of data or an abnormal condition has occurred, reissuing a damaged authentication card, or repairing the data of the lower certification authorities. The registration authority may authenticate the user even though he or she does not carry the authentication card based on the records held in the registration authority with a certain degree of reliability. For example, if the user have had his or her authentication card stolen, the user authenticated based on the data in the registration authority can call for suspension of the stolen card and reissue of the card.

At the registration authority, the memory medium recording the biological individuality data may be removed from the information communication channel of the user authentication system so that it can be connected only when it is necessary. This makes it possible to prevent raid by hackers, and hence the leakage and falsification of personal information. For security, it is extremely effective that only a part of the user's biological individuality data are recorded in the user authentication card and the lower certification authorities, respectively, so that integrity of the data is not allowed to be at one place.

The biological individuality data used in the user authentication system of the invention may include handwriting plus the input process. The handwriting well represents a biological individuality of each person and is effective in preventing others from imitating the individual's, and besides, the input device or analyzer is relatively easy to find. The user can write arbitrary letters or figures as his or her identification, but it is more desirable that the user writes his or her signature because of its better reproducibility. Others may imitate the written handwriting, but its input process, such as stroke order and stroke pressure, is to do with biological individuality of the person and this make is difficult for others to imitate. Therefore, the use of an on-line input device for adding information on the input process to the handwriting enables a highly reliable authentication.

The biological individuality data may also include a fingerprint, a voiceprint, an iris or retina pattern, and DNA information. Further, it is probable to find other biological individualities recognizable more easily and securely, in future.

The biological individuality data may be divided physically as recorded in the user authentication card and in the certification authority. For example, the first half and the second half of the biological individuality data may be recorded in the authentication card and in the certification authority, respectively, and checked separately. Alternatively, the information may be hierarchically divided such that information on the shape of handwriting is recorded in the user authentication card and information on the stroke pressure and stroke order is recorded in the certification authority.

Further, plural kinds of biological individuality data such as a signature and a voiceprint may be recorded separately to judge the personal identification based on different kinds of information so as to improve the reliability.

Furthermore, plural kinds of biological individuality data may be registered and make different transaction conducted in response to the type of input data.

In addition to the normal data of biological individuality, other unique information may be used together which is effective only in a special case. For example, in a case where a user is compelled to put his or her signature under the threat or duress by another person, the user can secretly add a hidden symbol or sign in his or her signature to notify a security firm of the emergency situation while making the threatener believe that he or she obediently puts his or her signature in usual way.

As an option on this scheme, it may make a show of normal transactions such as to unlock a door or to withdraw cash in order to ensure personal safety in such an emergency case. Such biological individuality data as to use for the emergent purpose may be the same type as that of normal data, or combined data of plural different types such as to add voice data to a signature. Reversely, combined data with special code data added to dummy data may be used as correct authentication data.

A user authentication card used in the user authentication system of the invention is a memory medium provided with a readable memory area which stores a signal for identifying the authentication card and at least part of the biological individuality data for distinguishing the individuality of a user from others.

The memory medium may be a read-only memory medium such as a ROM or CD-ROM, but a writable/readable memory medium may be possibly adopted which can add records of transaction details or new information because there is less danger of falsifying the contents of the record indicative of biological individuality data of the user therein.

It is desirable to use a high-security IC card having a high counterfeit-proof function and a large data space, mounting an intelligent function and an encryption system thereon.

If an IC card with a CPU and a RAM mounted thereon is used, the IC card can take biological individuality data of the user in the card and compare them with checking data stored inside for authenticating user identification. In this case, the load of the authentication access terminal and the device cost of the terminal can be reduced. Further, the authentication data of the user authentication card can be made unreadable from the outside for improving the security.

The use of an IC card enables to provide a multi-purpose card for achieving a high level of personal authentication with multiple functions mounted thereon. The IC card used here may be a composite type provided with a contact type that reads and writes data through an external terminal and a non-contact type that reads and writes data in a non-contact way without the external terminal.

In particular, if the information is dividedly recorded, since it is useless to falsify the contents of the record in the user authentication card, an economical and easy-to-use medium such as a floppy disk can be used as the user authentication card. There can be also used other writable media such as a CD-ROM, a DVD, a recording tape, or an MD.

The authentication IC card using an IC card for authenticating personal identification includes a CPU, an authentication file storing identity information, and application files classified according to the depth of authentication. In this configuration, when requested from the outside to present information recorded in any of the application files, the CPU compares identity information input from the outside with the identity information stored in the authentication file to confirm the authentication of the required level. Then, when an acceptance is derived from the comparison, the information of the application file is presented through the CPU.

In the conventional arts, an individual card has been issued for each individual case in which personal authentication is required, not only for reasons that a simple system makes it easy to handle and that it is difficult for various parties to tie up each other, but for reasons that various depth of authentication is required according to the contents of transactions and a single identity information is insufficient to cover various depths of authentication. Further, if a card holder has one card for plural transactions, technical immaturity may give excessive authority to the holder.

According to the authentication IC card of the invention, the application files in the card are classified according to the depth of authentication corresponding to the confidentiality of each file. When requested from the outside to present information recorded in any application file, the CPU checks and confirms the input identity information. Then, when the input identity information is authenticated in the corresponding depth predetermined for the file, the target information in the application file is presented through the CPU.

The identity information input by the card holder on the spot can be checked by an external device with the identity information provided from the card or prerecorded in the device. The use of functions of the external device enables complicated image processing or information processing, and this is effective in a case where the CPU capacity or memory space of the authentication IC card is not sufficient. Further, the use of the identity information dividedly stored in external devices assures reliable authentication.

The identity information stored in the authentication file can include biological information for use in distinguishing the individuality of an authentic holder of the IC card.

Some of the application files classified according to the depths of authentication may record only IDs for use in various transactions. Such IDs become effective when the card holder is verified as to whether he or she is eligible to access external transaction information in an external source.

Other private information of the holder may also be recorded in the application files. Since the authentication IC card of the invention has high capability to authenticating personal identification, no one can access the personal information of the card without permission of the holder, and this makes privacy protection perfect.

A mechanism may be used together with the above mechanisms, in which qualification conditions to access each application file are pre-registered so that only the qualified persons are allowed to access the corresponding file. The files can be arranged two-dimensionally in combination with levels of authentication, and this makes it possible to respond to more complicated requests.

When using the authentication IC card of the invention, information as an entrance certificate or a bank ID is stored in the application files, while authentication procedures required for respective transactions are specified, at first. Further, identity information to be used for authenticating personal identification is stored in the authentication file.

For example, admission into a certain building may require only to carry the authorized authentication card without other specific authentication requirements, but admission into an office requires the user not only to carry the authentication IC card, but also to pass in password check for confirming that the card holder is authentic. Further, admission into a morgue requires stricter authentication to check his or her fingerprint.

In this case, information indicative of the authenticity of the card, the password of the holder, and the fingerprint information are recorded in the authentication file; while a code signal for opening an entrance door of the building, a code signal for opening a door of the office, and a code signal for opening a door of the morgue are stored in each application file.

The person carrying the authentication IC card has the card read out by a card reader attached to the door. The card reader takes in the card information and confirms that the card is authentic and the password matches up. If the card has passed in the check, the door is opened to get the card holder in.

At the door of the office, the card reader is equipped with a keyboard on which the card holder needs to input the password while having the authentication IC card read out. When the authenticity of the authentication card is confirmed, and the password input by the card holder matches with the password recorded in the authentication file of the authentication IC card, the code signal for opening the door is sent to the card reader through the CPU. Then, when the code signal is correct, the card holder is allowed to enter the office.

At the door of the morgue, the card reader is equipped with a fingerprint reader. The card holder who want to enter the room needs to have the authentication IC card read out by the card reader and to put his or her specified finger on the fingerprint reader. When the fingerprint matches with that recorded in the authentication file, the code that instructs opening the door is sent to the card reader through the CPU. Then, when the card reader judges the code signal to be authentic, the door is opened to get the card holder in.

The same mechanism can be applied to financial systems.

A credit card may diminish utility if elaborate input procedure of a signature is required for every cheap purchase. On the other hand, expensive purchases such as jewels and ornaments need to strictly authenticate personal identification. Thus, although the level of authentication varies corresponding to every user's passwords to be output from the application file according to the type of credit, the authentication IC card of the invention can deal with different levels of authentication.

Further, qualification conditions to access each application file can be pre-registered so that only the qualified persons are allowed to access the corresponding file, thus limiting information access by the card reader only to necessary area in order to prohibit excessive disclosure of personal privacy.

For example, an undo-a-lock system is allowed to request only the identity information and the unlock code signal, so that the CPU eliminates excess access by the system to a file storing medical records. In some cases, the CPU may shut down all the information exchange against unauthorized access to prevent information from getting stolen or falsified.

The authentication IC card of the invention records a code signal for permitting a certain transaction or service in the authentication IC card possessed by a person qualified for the transaction or service. The authentication card is used to authenticate the person carrying the IC card is to be the genuine holder of the card each time the transaction or service is conducted.

Therefore, the service provider should receive the information from the authentication IC card indicating that the person carrying the card is the authentic card holder and that such a code signal as to prove the eligibility of the service is recorded in the card. On the other hand, the authentication IC card should confirm that the card reader is proper and that the person carrying the card is the authentic card holder.

The authentication IC card of the invention stores attributes information of the card holder, including qualification to enter a building or a morgue, a bank account, possession of credit, a family register or history, and the balance of electronic money account, and this makes it possible to integrate authentication data for all the qualified transactions into a single card.

The authentication IC card of the invention gives transaction qualifications to the card holder, not to the card itself, so that it can be operated based on more essential confidence compared to the conventional card system. It is therefore unnecessary to hold plural cards issued for respective services as in the conventional system, and hence unnecessary to strictly control the use of the card against unauthorized persons as in case of an undo-a-lock card shared with plural persons, for example.

The authentication IC card of the invention can authenticate the proper card holder based on only the information recorded in the IC card and the information input by the card holder on the spot. Since the card security becomes more important than in the conventional system, the authentication IC card is provided with high-security means to prevent persons other than the authentic transaction user from misappropriating the authentication card. Such means include biological information of the transaction user, such as a signature, a voiceprint, a fingerprint, a palm-print, or an iris, together with a password having a high degree of flexibility, thus preventing persons other than the authorized user from misappropriating a stolen or picked-up authentication IC card directly or after tampering.

The authentication IC card also should be provided with means to inform the user of the identity information recorded thereon when the user forgets his or her own identity information. Further, there may be also a case where the user needs to rewrite or renew the identity information. Therefore, others may misappropriate the above means to cheat the person in charge or act in collusion with the person to misappropriate the identity information illegally obtained.

Furthermore, the identity information illegally obtained may be used to rewrite the IC card, or to make a forged authentication card from a new IC card. Such criminal conducts are difficult to be fully eliminated.

Despite of the high-security characteristics, even the authentication IC card finds it difficult to prevent a person familiar with the system or an insider from evilly falsifying or counterfeiting the authentication IC card.

To prevent this, an authentication IC card of the invention includes a CPU, an authentication file storing the identity information or both of the identity information and the authentication information, and an application file storing job programs or relevant data classified according to the depth of authentication. And when the application file is accessed from the outside, the authentication IC card allows the access as a result of truth judgment based on the identity information or the authentication information of the authentication file. The authentication file in the authentication IC card of the invention stores, in addition to the identity information on the authorized user, identity information on a second person or authentication information on a second organism. And jobs or data treated by the card are predetermined corresponding authentication of the second person or organism to be requested. When the specific job or data is requested to be executed or shown, the CPU compares identity information or authentication information input from the outside with the information in the authentication file, and when the authentication is acceptable, execution or showing of the specific job or data is allowed.

The authentication IC card of the invention requires the approval of an authorized second person or organism (hereinafter, called the witness) in addition to the authorized user of the card for accessing the specific job or data. In this case, such a job as to call for confirmation of the validity of the authentication IC card itself or the validity of the user can be specified for a superior level of security.

The approval of the witness becomes effective only when the witness is authenticated based on the identity or authentication information recorded in the authentication IC card.

For example, one or more witnesses may be present at the issue of the authentication IC card so that the identity information or authentication information on the witnesses can be recorded in the authentication IC card together with the information on the user. The user of such an authentication IC card is required to obtain the approval of the witnesses at the time of disclosure of the recorded identity information on the user or renewal of the identity or authentication information even if the user himself is authenticated. The witness or witnesses may be the third party trusted by the user, or someone designated by the person in charge of issuing the card, or an organism as an institution or organization such as the issuer.

Such a system requires the approval and the authentication of the witness other than the user, or the user must pass in authentication together with the witness, and this makes it possible not only to prevent others from stealing the identity information for misappropriating the authentication IC card, but also to prevent others from acting in collusion with the person inside to rewrite the identity information.

Further, since a superior level of security can be set for the authentication based on the reliability inherent in the authentication IC card, the security of the authentication IC card can be protected even if there is no extreme security system in the card issuing station of the authentication IC card. Further, all the personal data can be stored in the authentication IC card and no backup data is left in the card issuing station.

It is therefore possible to easily establish a card issuing system with a high level of confidence.

It should be noted that either the CPU in the authentication IC card or an external device can judge the authentication. If an external device is used for the judgment, the identity information or authentication information stored in the authentication file is output to the external device via the CPU. Then, when the external device judges the authentication to be acceptable, access to the application file is allowed through the CPU.

If the CPU in the card judges the authentication, the facilities on the side of the IC-card reader can be simplified, and hence the equipment cost at the site can be saved.

The use of the external device allows the IC card performance simplified. Further, when the identity information is shared with a memory device outside of the authentication IC card, the card adapts to a system requiring higher security.

The identity information preferably includes biological information distinguishing the individuality of the proper holder of the authentication IC card. The biological information may include a signature, a voiceprint, a fingerprint, a palm-print, and an iris. It is needless to say that a password having a high degree of flexibility can be used together with the biological information.

Further, transaction logs relating authentication of the witness are preferably recorded in the authentication IC card.

Such logs are useful to presume circumstances and causes of the accidents occurred.

A user authentication device of the invention for authenticating personal identification by means of a user authentication card includes an authentication-card reader for reading out information recorded in the user authentication card, an identity acquisition unit for obtaining biological individuality data of a user, a judgment unit for collating the biological individuality data in the authentication IC card read out by the authentication-card reader with the biological individuality data obtained on the spot through the identity acquisition unit and judging the acceptance, and a display unit for displaying the judgment result.

According to the user authentication device of the invention, the user who is requested to authenticate personal identification puts the user authentication card in the authentication-card reader, and inputs through the identity acquisition unit his or her biological individuality data of the same kind as that recorded in the user authentication card. As a result, the judgment unit checks the biological individuality data recorded in the user authentication card with that obtained by the identity acquisition unit and judges whether the checking result is acceptable, while the display unit indicates the judgment result. Thus, the person carrying the user authentication card can be judged immediately to be a proper card holder or not without external communication.

The user authentication device should be equipped with the identity acquisition unit of the same type as the biological individuality input device used in the user registration station. A device having a function to take in handwritten figures may be used as the identity acquisition unit. The handwritten figure acquisition unit can input the predetermined handwritten figure, such as a signature, as digital data and easily compare the input figure with the biological individuality data on the user authentication card.

The user authentication device of the invention preferably includes a communication unit for communicating with an outside certification authority, in which at least part of the biological individuality data of the user input through the identity acquisition unit is sent to the outside certification authority so that the user authentication device can receive the pass/fail judgment result from the certification authority and display the result through the display unit.

If the user authentication device is connected to the outside certification authority for hierarchical processing of the authentication data, invaders' evil access or falsification can be prevented, and this makes it possible to offer authentication performance with a higher level of security.

The user authentication system of the invention can be applied to a lock control system. A lock control system of the invention uses an IC card as a key with personal authentication data of a user recorded thereon, in which the identity data input by the user on the spot is checked against the personal authentication data, and the lock is released when the user has passed the authentication check.

In the lock control system of the invention, the user authorized to use the lock is given a user authentication card as a key card formed with an IC card storing personal authentication data of the user. When undoing the lock, the user presents the key card and inputs his or her identity data. The identity data input by the user on the spot is checked against the data recorded in the key card, and if they match up within an acceptable range, the lock is unlocked.

Since the lock is never opened when the identity data of the accessing person does not match with the personal data recorded in the key card, only the authorized person can undo the lock.

Such a system is to authorize a qualified user to open the lock and the key card is used only for certificating whether the person carrying the key card is qualified or not. In the system, the key card has only a part of key functions.

Therefore, even if others have picked up, stolen, or duplicated the key card, no one but the qualified user can undo the lock, thus enhancing the security of lock.

Further, since personal information on the user is stored in the key card, the lock device needs neither to hold a vast database for storing large amount of information related to all the potential users, nor to be provided them from the host device through high-speed communications.

However, part of the personal information can be stored in the memory device on the lock side to be used together with that recorded in the key card for a higher level of security.

The personal identity data recorded in the key card may be information on the user's living body or information data created by the user. Such information can further enhance the security of lock.

Furthermore, the key card may record a certain personal authentication data selected from plural kinds of them.

If there is such a mechanism as to prevent others from identifying the kind of authentication data held on the key card, others who try to misappropriate the key IC card cannot use stolen cards unless they know which of a fingerprint, a voiceprint, a signature, a password or others is used as the authentication data, thereby reducing damage from stolen cards.

Furthermore, an access terminal may be provided with plural kinds of identity data input means corresponding to plural kinds of personal authentication data so that the user can select one of them. If plural kinds of authentication data are selectable, others who try to misappropriate the key card need to decide the proper type of authentication data used on the key card, and this improves the security of lock. Of course, the plural kinds of personal authentication data may be used together in combination so as to prevent the lock from being opened unless all the selected data has passed the authentication check.

Furthermore, plural locks may be treated by one key card, and the types of personal authentication data are selectively applied to the respective locks.

In this case, not only the cost can be reduced compared to a case where one card is issued for each lock, but also the number of key cards carried by one user can be reduced and the user is released from selecting a corresponding card for each lock.

Such a key card can also be effective in common use for a lock for a door and locks for classified shelves in a memory. If the memory is furnished with shelves different in care level, such as shelves for normal medicines and shelves for strong medicines, even persons authorized to open only the door of the memory may not be allowed to open the shelves for strong medicines. It is also applicable in such a case where personnel documents and accounting documents are stored in the memory but only the persons in charge of each department can access each relevant documents.

In these cases, an alarm function can be attached to the system to issue the alarm when a person other than the qualified persons accesses the place or materials, thus improving the security. For this purpose, sensors for detecting persons' access may be provided to the shelves inside the memory. Since the sensors do not need to operate upon access by any authorized person, the sensor circuitry relating to the restricted area for which the authorized person has already passed in the personal authentication should be controlled not to output the alarm.

This system may be configured such that an unauthorized person's access is notified in the control room and that the door of the memory is shut down to prevent the unauthorized person from running away.

Further, the lock control system of the invention has a function of identify the person individually who has accessed the lock, the accumulated access data automatically generates an inventory record of the memory.

The lock control system of the invention can also be provided for security of safe boxes storing valuables. In particular, the application to safe-deposit boxes can offer an adequately safe facility for the safe-deposit box system even without any witness from the management side. Further, users themselves of the safe-deposit boxes can determine depth of security according to the value of stored things.

BRIEF DESCRIPTION OF DRAWINGS

FIG. 5 is a flowchart illustrating the process of issuing the user authentication card in the embodiment;

BEST MODE FOR CARRYING OUT THE INVENTION

Embodiments of the invention will be described with reference to the appended drawings.

Figure 1:
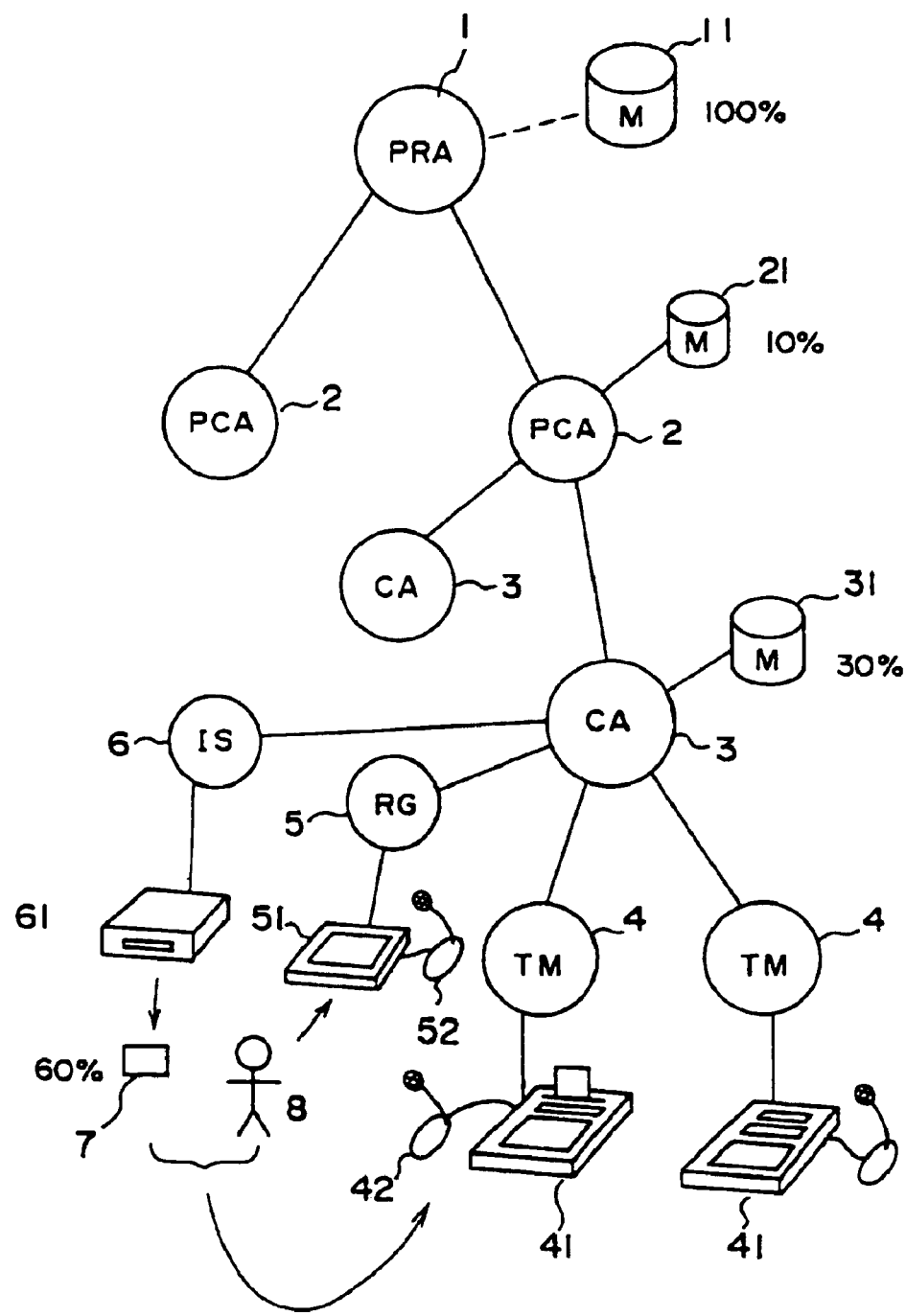
FIG. 1 is a block diagram illustrating a user authentication system as practiced in an embodiment of the invention.

As shown in FIG. 1, the user authentication system of the invention is of hierarchical structure in which an authorized registration authority, certification authorities, and authentication access terminals are arranged hierarchically.

The authorized registration authority or the policy registration authority (PRA) 1 supervises the entire authentication network and issues certificates of commission of partial power to a plurality of intermediate certification authorities or policy certification authorities (PCA) 2 as licensees. The policy certification authorities given the power then issues certificates of commission of partial power to a plurality of end certification authorities (CA) 3 as sub-licensees.

The end certification authorities (CA) 3 act as go-betweens in connecting authentication access terminals (TM) 4 as clients who make use of user authentication, and users 8 who enjoy services offered by the clients. In the following description, access to various services may be called "transaction."

The authorized or policy registration authority (PRA) 1 is provided with a memory 11 removable from the main equipment, while the policy certification authorities (PCA) 2 and the end certification authorities (CA) 3 are provided with memories 21, 31 connected to respective equipments at all times.

These facilities are connected with each other through dedicated lines or public lines, so that information can be exchanged at any time. The connections may be made via the intranet or the internet. In exchanging information through the communication lines, it is preferable to ensure security through an encryption system using public keys or common or symmetric keys.

The policy certification authorities (PCA) can be eliminated from the user authentication system. Reversely, the policy certification authorities (PCA) can be provided over plural levels to increase the depths of the hierarchy to more than three.

The policy registration authority (PRA), the policy certification authority (PCA), and the end certification authority (CA) may also be replaced by an institution which integrates all the functions.

The end certification authorities (CA) 3 are generally empowered by the policy registration authority (PRA) or an upper certification authority (PCA) to execute authentication in a limited region such as a public administrative agency, a medical institution, a specific company, an apartment building, a mall, and the like.

The end certification authority (CA) is connected to authentication access terminals (TM) which belong to the limited region and use the authentication.

The authentication access terminals (TM) may represent a window of a government office, a division reception desk or pharmacy reception desk in a hospital, a door in a laboratory or office, an information tool accessing a database to be protected, an apartment entrance or an apartment door, a remote control device for indoor utilities, a member-only club facility, a checkout counter at each store in a mall or in a large retail store such as a department store, a window in a monetary facility such as a bank, an automatic teller machine, and so on.

In particular, it is considered that user authentication will be more important in the field of direct marketing hereafter. In this case, the authentication access terminal 4 may be placed in home of each user 8.

The end certification authority (CA) 3 authorizes a user registering station (RG) 5 to receive a registration application from a user 8 who wants to be a consumer of an authentication access terminal (TM) 4, and authorizes an authentication-card issuing station (IS) 6 to issue user authentication cards 7.

The user registering station (RG) 5 is furnished with an input device 51 for obtaining biological individuality data. This embodiment uses an on-line handwritten-figure input device with a tablet and a pen. The on-line handwritten-figure input device input handwriting of a user with the process of writing for graphic recognition, so that, when letters are input, the information on direction and order of each stroke of letters can easily be obtained.

When a voiceprint is used as means of capturing the biological individuality, a microphone 52 is equipped for input user's voice. Any other device, such as a fingerprint or palm-print input device, or a device for observing a pupil to take in an iris or retina pattern, can also be provided.

The use of a plurality of personal identification means makes the authentication more securely.

The authentication-card issuing station (IS) 6 is furnished with an authentication-card issuing device 61. The authentication-card issuing device 61 writes the information to be used for user identification in a user authentication card 7 and issues the authentication card to the user 8. In this embodiment, the user authentication system uses an IC card as the user authentication card. However, any other recording medium can be used as long as it is available for write and read operations, i.e., any other electronic recording medium can be used, such as a magnetic recording medium including a CD-ROM, a floppy disk, and a magnetic card, or a magneto-optic recording medium.

The authentication access terminal (TM) 4 is furnished with a user authenticating device 41 that examines genuineness of the user authentication card 7 carried by the user 8 and authenticate the user 8.

Figure 2:
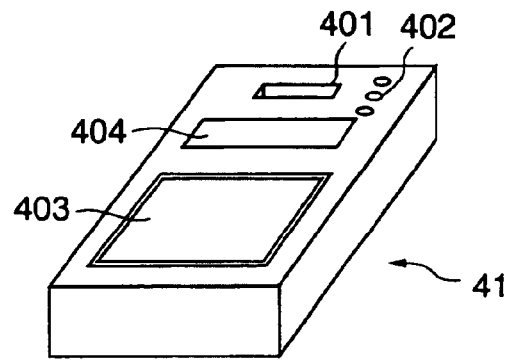
FIG. 2 is a perspective view illustrating an example of a user authentication device used in the embodiment.
Figure 3:
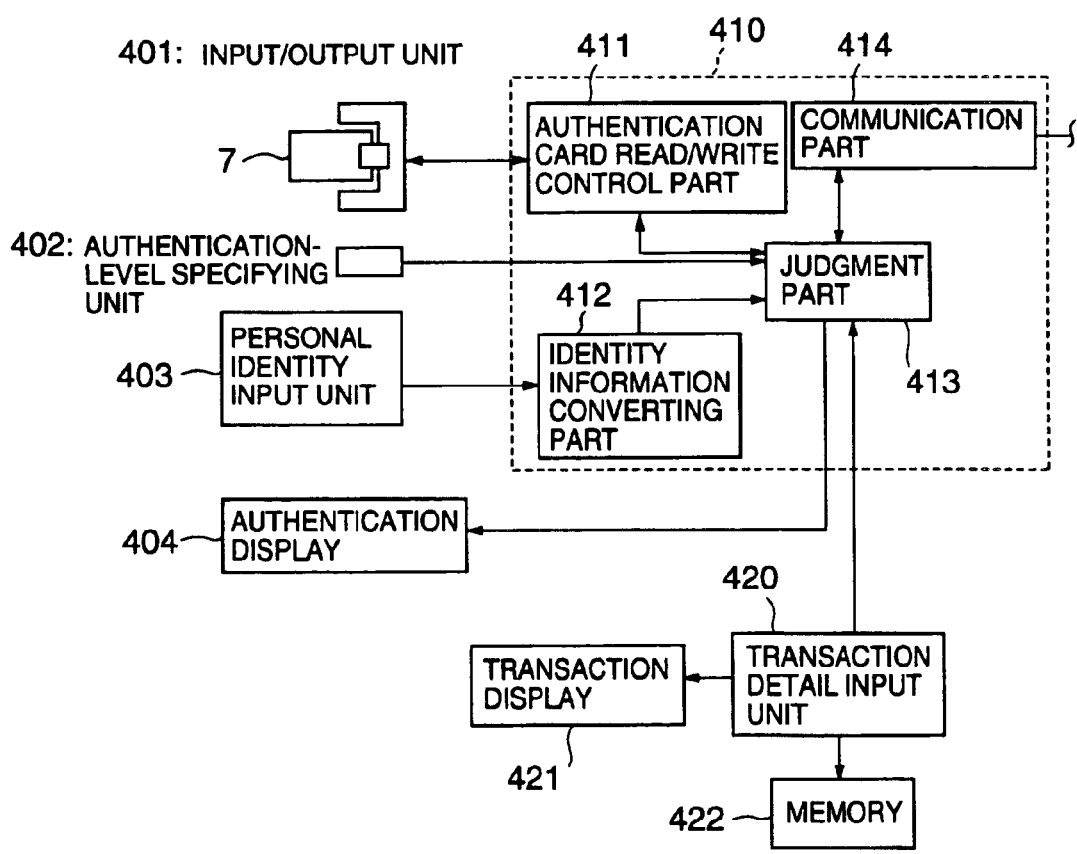
FIG. 3 is a circuit diagram of the use authentication device of the embodiment.

FIGS. 2 and 3 show an example of a configuration of the user authenticating device 41.

Arranged on the front panel of the user authenticating device 41 are an input/output unit 401 with a slot for inserting an authentication card 7, which exchanges information with a memory area of the inserted authentication card 7; an authentication-level specifying unit 402 that specifies the depth of authentication required for the current transaction; a personal identity input unit 403 that takes in a biological individuality data of the user; and an authentication display 404 that displays the authentication result.

The personal identity input unit 403 is the same as the biological individuality input device 51 used at the user registering station (RG) 5. If the voiceprint is used together in user authentication, a microphone 42, of course, needs to be provided to the user authenticating device 41 of the authentication access terminal (TM) 4. The personal identity input unit 403 is thus equipped with respective input means corresponding to types of the biological individualities to be used.

Electronic circuitry 410 is incorporated inside the user authentication device 41; it acts to organically combine the functions of these units for user authentication.

The electronic circuitry 410 includes an authentication card read/write control part 411, an identity information converting part 412, a judgment part 413, and a communication part 414.

The authentication card read/write control part 411 has the functions to read the contents of information recorded in the authentication card through the input/output unit 401, to decode the encrypted digital data, and to record the transaction results onto the authentication card as well.

The identity information converting part 412 converts the biological individuality data taken in by the personal identity input unit 403 to digital data.

The judgment part 413 takes in output information from the authentication card read/write control part 411, the identity information converting part 412 and the authentication-level specifying unit 402, authenticates user identification according to the level of required authentication based on those output information added with information exchanged with the certification authorities through the communication part 414, and indicates the authentication result through the authentication display 404.

When the user is authenticated and a transaction is established, then the transaction result is input from a transaction-detail input unit 420 and the transaction details are displayed on a transaction display 421, so that the user 8 can confirm the transaction details. The transaction details are also recorded in a memory 422.

The judgment part 413 may be designed to automatically send the user authentication result to the transaction-detail input unit 420 so that the transaction may be determined to be accepted or refused.

Further, the transaction details or transaction history may be recorded in the user authentication card 7 by inputting the transaction information via the transaction-detail input unit 420.

As an example, when the user authentication card 7 is used for settlement purpose, the purchasing date, purchased product names, and their prices can be recorded, and those make it easy for the user to confirm the transaction at payment. When the card used for administrative services, information related to various certificates or identification papers such as health insurance card, driver's license, medical record and certificate of residence, can be received and stored in the user authentication card 7.

Privacy of the user can be protected by requiring user authentication anytime when a person reads the contents recorded in the user authentication card 7 so that any access by all but the user concerned shall be prohibited.

In addition to the biological individuality data used for normal authentication, other unique information that is effective only in special cases may be used together. For example, in a case where a user is compelled to put his or her signature under the threat of a robber or duressor, the user can secretly add a hidden symbol or sign in his or her authentic signature to notify a security firm of the emergency situation while normal transactions are taking place such as opening a door or withdrawing cash, so that the security officers can take appropriate action such as to arrest the criminal as soon as the safety of the user is ensured.

Such biological individuality data as to use for special purposes may be combined data of plural different types such as twice coughs at the time of signature.

Figure 4:
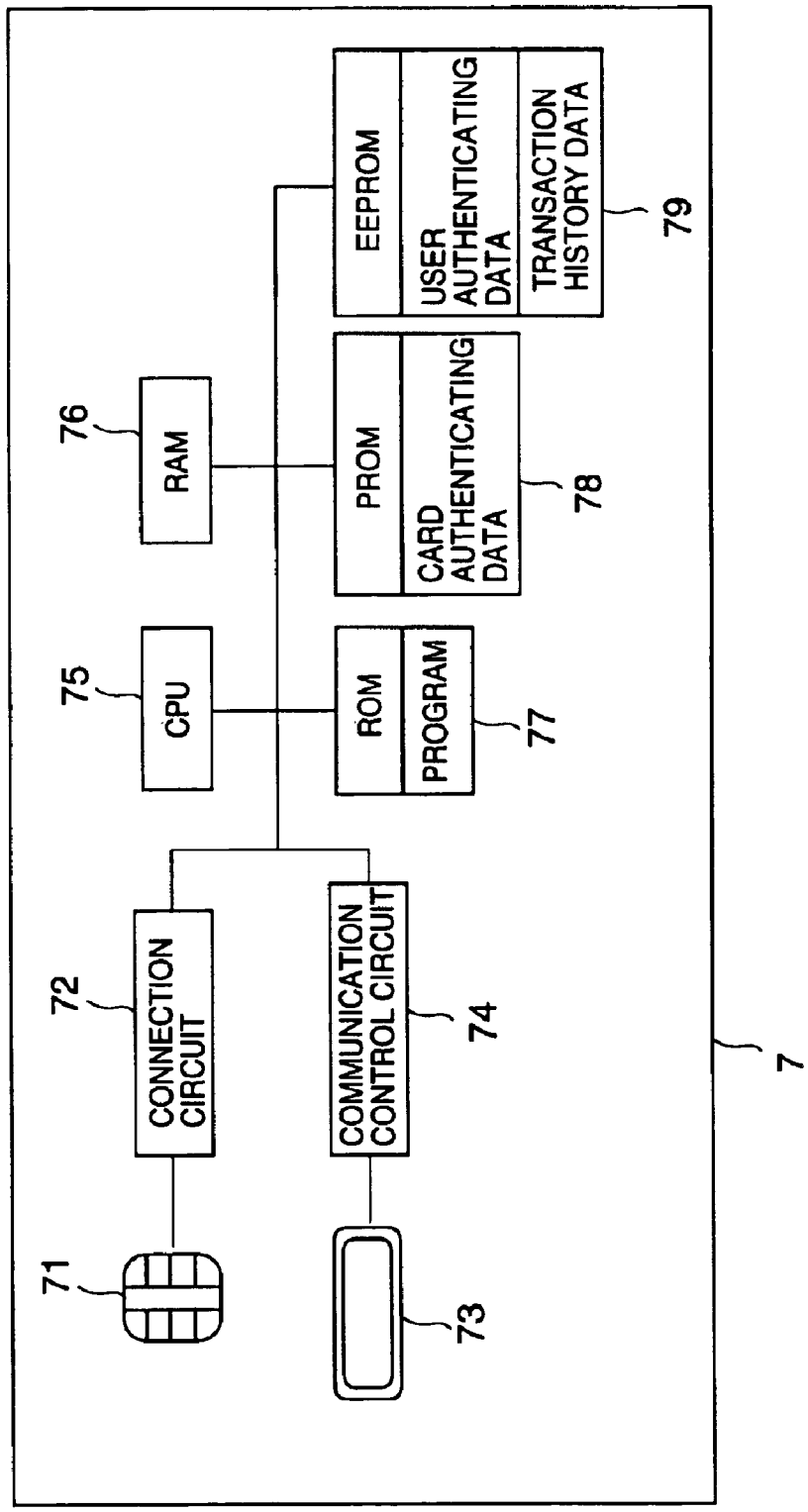
FIG. 4 is a block diagram illustrating the first and second examples of configurations of an user authentication card used in the embodiment.

FIG. 4 is a block diagram illustrating internal arrangements of the user authentication card 7 made of an IC card.

The user authentication card 7 as practiced in the embodiment is a composite-type IC card provided with a contact type connector transmitting electric signals through a terminal 71 and a non-contact type connector establishing communication by means of electrostatic coupling or electromagnetic induction without contact between an electrode 73 in the card and an electrode inside the authentication card read/write control unit. The user authentication card 7 is designed in consideration of a case where plural card issuers place a commonly usable terminal, respectively, for a single common card to be openly used by its carrier for respective issuers. The IC card, however, may be provided with either one of the connectors.

The terminal 71 is connected to a connection circuit 72; the non-contact type electrode 73 is connected to a communication control circuit 74. Both are coupled with built-in memories.

The user authentication card 7 also includes a CPU 75 and memories comprising of a random access memory RAM 76, a read-only memory ROM 77, an electrically-writable, programmable read-only memory PROM 78, and an electrically-erasable, programmable read-only memory EEPROM 79. These are connected with each other through a bus.

The connection circuit 72, the communication control circuit 74, the CPU 75 and the memories can be mounted on a single IC chip.

Upon insertion of the user authentication card 7, the authentication card read/write control unit 411 accesses the memories of the user authentication card 7 either from the terminal 71 through the connection circuit 72, or from the non-contact electrode 73 through the communication control circuit 74.

The PROM 78 stores card authentication data for examining the authenticity of the authentication card concerned and an ID of issuer that has issued the user authentication card upon approval, and the like. The data once written in the PROM 78 cannot be renewed.

The EEPROM 79 stores biological individuality data for use in authenticating user identification and the record of transactions executed using the authentication card. The ROM 77 stores programs for control of the CPU 75 to execute encryption and decryption, control of data input/output, examination of the authenticity of the user authentication device 41, and so on. The RAM 76 temporarily stores data taken from the outside and data needed in the computing process, and so on.

Unused user authentication cards 7 are distributed to each authentication-card issuing station 6 on the condition that correct card certificate information has been written in the PROM 78 at the authorized or policy registration authority 1 to prove that the authentication cards are genuine cards available in the authentication system. Therefore, all the authentication-card issuing station 6 has to do is to write in part of biological individuality data of the user in the EEPROM 79 in accordance with instructions by the authorized registration authority 1. In this regard, the writing function of the PROM 78 may be omitted from the authentication-card issuing device to prevent the card from being falsified.

The authentication card is not limited to the arrangement or allotment of the memories as practiced in the embodiment. For example, the biological individuality data for use in authenticating personal identification may be stored in the PROM 78 or RAM 76.

The following section describes, along with FIG. 5, an example of the process of issuing a user authentication card.

The user registering station 5 accepts a registration application from a user 8 who wants to receive services at authentication access terminals within the territory of the user registering station 5 (S11). The user registering station 5 gathers information indicative of biological individualities of the user, and if necessary, information for use in pre-qualifying the user 8 (S12). The biological individuality data used here are characters unique to the user's living body; they should be selected for characteristics through which the user can be distinguished from others in disguise or in imitation of the user.

In the embodiment, handwriting is used for identifying the user. Although any figure is possible, if the user 8 inputs different figures every time, it would be inconvenient to authenticate personal identification. It is therefore desirable for the user to put his or her own signature so as to secure the reproducibility. In addition to the handwriting, the use of plural biological individuality data can improve the security of authentication, and hence, the auxiliary microphone 42 is provided here for acquiring voiceprints.

The qualification information and the biological individuality data of the applicant, both gathered at the user registering station 5, are then transmitted to the authorized registration authority 1 (S13).

The authorized registration authority 1 pre-qualifies the applicant based on the information from the user registering station 5, and permits the issue of an authentication card to the applicant who has passed in the pre-qualification (S14). The qualified conditions depend on the target services for which the user requests the authentication. In this regard, the end certification authority 3 that actually accepts the user may examine the qualification of the user.

The authorized registration authority 1 divides the biological individuality data of the registered user 8 hierarchically into data parts according to predetermined proportions, decides the parts to be assigned to the user authentication card 7 and the certification authorities 2, 3, respectively, and distributes them to each place (S15).

The biological individuality data distributed from the authorized registration authority 1 to each place is to be accessed based on the authentication accuracy required by the authentication access terminal 4. If the authentication access terminal 4 requires the least-level of authenticity, the authentication needs only the checking result of the authentication device 41 of the authentication access terminal 4. If a medium-level of authenticity is required, the user is to be authenticated based on the checking result of the authentication device 41 plus the information stored at the end certification authority 3. If the highest-level of authenticity is required, all the biological individuality data distributed to all the different places should be integrated for the judgment.

The user authentication system of the invention is constituted such that further authentication by the upper authorities based on the biological individuality data can be requested only when the authenticity has examined and passed at the authentication access terminal. The upper authorities execute authentication based on the information except included inside the user authentication card.

Therefore, the user authentication card 7 needs to be distributed with information enough for certification with a degree of accuracy by comparing with biological individuality data input by the user at the spot so that the user can be judged to be authentic.

In this embodiment, 60% of information is assigned to the user authentication card 7, 30% to the end certification authority 3, and the rest of 10% to the intermediate authority 2. Such a gradual decrease of information amount can not only save the memory capacities at the upper authorities, but reduce load time for each authentication as well, thereby improving information protecting performance throughout the entire system.

It should be noted that it is desirable for the user authentication card 7 to hold a relatively high percentage of biological individuality data so as to prevent excess amount of information from being transmitted to the upper authorities upon request to execute a higher-level of authentication.

On the contrary, excess percentage of information to be assigned to the user authentication card 7 may lower the reliability of user authentication.

It is therefore essential to distribute the biological individuality data in dividing proportions adapted to each practical conditions in consideration of number of user accesses, required level of authentication security, and so forth.

Information may be divided such that all the digitized data is divided physically in predetermined proportions, or divided on the step-by-step basis. For example, information of handwriting may be divided into information related to a final figure of handwriting, information related to stroke on the way of writing, and information on the stroke order. Any biological individuality data can be divided for use in each related spot, for example, a voiceprint can be divided by frequency band, or a fingerprint can be divided by finger.

In the case a plural types of biological individuality data such as handwriting and a voiceprint are extracted, the biological individuality data may be distributed by type.

The authorized registration authority 1 stores information related to the authentication card and the user in a large-capacity memory means 11 removable from the main device, such as a magnetic tape, a CD-ROM, a magneto-optical disk, a DVD, or a removable hard disk (S16), and upon receipt of a request from a lower authority, a person in charge inserts the memory means into a driver in order to check the registered information.

At the authorized registration authority 1, the removable recording medium 11 is stored by separating it from an external communication network when it is not in use so as to prevent violence or falsification of records.

The certification authorities 2, 3 stores distributed part of the biological individuality data of individuals into the memories 21, 31, respectively, and reads out it on demand.

The authentication-card issuing station 6 records the part of biological individuality data of the registered applicant distributed by the authorized registration authority 1 in a user authentication card 7 which records its own card authentication code, and issues the card 7 to the user 8 (S17).

A plurality of user registering stations (RG) 5 and authentication-card issuing stations (IS) 6 can belong to a single end certification authorities (CA) 3.

Further, since the user 8 is required to go to the user registering station 5 and input his or her biological individuality data, the authentication-card issuing station 6 for issuing the card to the user 8 is convenient for the users if it locates at the same location as the user registering station 5.

It may also be useful to have a reliable witness to identify the user 8. But it is hard for any mechanism to exclude a person pretending to be another person from the beginning.

Further, the authentication card is not necessarily issued immediately after the registration procedures, and it may be mailed later to the user's address in order to confirm the facts the user has declared.

Furthermore, the user registering station (RG) 5 and the authentication-card issuing station (IS) 6 may belong to the authorized registration authority (PRA) 1.

Furthermore, an issuer can conduct registration/issue procedures at any place if the issuer carries a portable terminal having the same functions as those provided at the user registering station (RG) 5 and the authentication-card issuing station (IS) 6. The use of such a portable terminal should be restricted to only the issuers who have been authentically licensed by the authorized registration authority (PRA). Even in this case, the issuer is never permitted to use the portable terminal without passing in strict examination and receiving a certificate of issuer.

Figure 6:
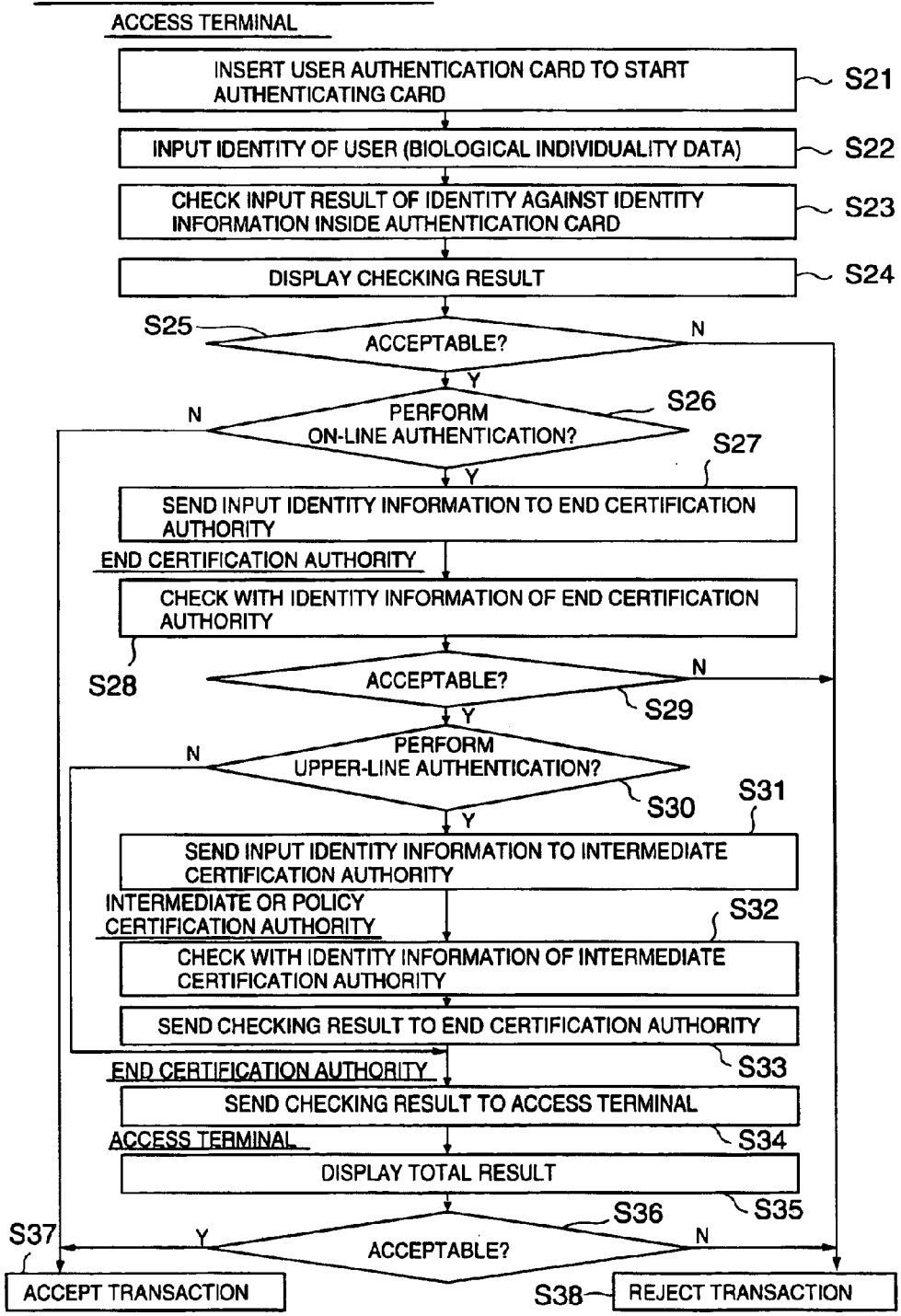
FIG. 6 is a flowchart illustrating the process of authentication at an access terminal in the embodiment.

The following section describes, along with FIG. 6, an example of the process of authenticating user identification using a user authentication card 7 at an authentication access terminal 4.

When a user 8 presents his or her user authentication card 7 and applies to a transaction at an authentication access terminal 4, the user authentication card 7 is inserted into the card slot (input/output unit) 401 of the authentication device 41 of the authentication access terminal 4 to read out the authentication information from the user authentication card 7. The authentication information includes information for confirming the authenticity of the card and biological individuality data for use in authenticating user identification.

At the authentication access terminal 4, the card is authenticated first (S21). The card authentication confirms that the user authentication card 7 is authentic, i.e., that the card is adapted to the user authentication system for use at the authentication access terminal 4, and that the person is the authentic holder of the card. If the user authentication card 7 is not adapted to the authentication system, any transaction will not be accepted at the authentication access terminal 4 from the very first.

It should be noted that, in order to confirm that the user authentication card 7 is not accessed by an unauthorized device, there may be provided a mechanism in which a program in the user authentication card 7 verifies whether the authentication device 41 is qualified to the authentication card itself, and if the device is not proper, the authentication card rejects the disclosure of the stored contents.

When the user authentication card 7 has passed in the authentication, the user 8 is then required to show the same biological individuality as the user deposited when obtaining the user authentication card 7, e.g., to put his or her signature on the tablet (personal identity input unit) 403 (S22).

The biological individuality data input from the tablet 403 is checked against the biological individuality data recorded in the user authentication card 7, which is, for example, 60% of the biological individuality data of the user, and the user 8 at the window is judged to be the authentic holder of the user authentication card 7 or not (S23). The user authentication result is displayed on the display 404 (S24).

The subsequent procedures at the authentication access terminal 4 vary according to whether the user has been authenticated or not (S25). If the user authentication is negative, the authentication access terminal 4 will reject any transaction (S33). If the user authentication is affirmative, it is checked whether or not further on-line authentication is to be requested from upper authentication institutions (S26). If no on-line authentication is needed, the authentication access terminal 4 may accept the transaction applied by the user 8 at once (S32).

The presence or absence of request and the depth of the request for the on-line authentication may be input by an operator or the user 8 with the authentication-level specifying unit 402 at every transaction, or may be automatically set based on nature of the transaction or the transaction money.

If the on-line authentication is needed, a request for a certain level of authentication is sent to the end certification authority 3, together with the information of the user authentication card 7 and the personal identity information obtained at the personal identity input unit 403 (S27). The personal identity information to be sent can be a part, for example, 40% of the personal identity information, exclusive of the part used at the authentication access terminal 4, so that the quantity of information exchanged between the authentication access terminal 4 and the end certification authority 3 can be reduced.

The necessity of the on-line authentication should be determined according to the level of security required based on the nature of the transaction. Specifically, commercial transactions about highly realizable goods or expensive goods, disclosure of personal information, and something like that require secure authentication; such transactions should request user authentication of upper authorities.

The depth of on-line authentication may also be specified by the nature of the authentication access terminal 4. For example, at a hospital reception desk, a high level of authentication of personal identification may often be required to protect a person's privacy and insure accurate medical treatment. Especially, in case of telecommuting medical treatment, it is preferable to request user authentication from the upper authorities.

The information sent to the end certification authority 3 is checked with the identity information characteristic of the user 8, the identity information stored in the memory 31 (S28), and the authentication results are forwarded to the authentication access terminal 4 (S29).

Since the end certification authority 3 has only the record for 30% of the identity information on the user, if the user authentication at the end certification authority 3 is insufficient, further user authentication will be requested from the policy certification authority 2. Since the policy certification authority 2 has only the record for 10% of the identity information on each user, the policy certification authority 3 uses 10% of the identity information obtained at the authentication access terminal 4, so that the information to be sent from the end certification authority 3 to the policy certification authority 2 can be vastly reduced.

The user authentication results of the policy certification authority 2 are sent back to the authentication access terminal 4 through the end certification authority 3.

The user authentication results of all the authenticating facilities are integrated into a resultant total output and displayed on the authentication display 404. If the total result satisfies the user authentication, the transaction is accepted (S32), and if not satisfy, the transaction is rejected (S33).

When the user authentication is denied, there is a possibility of any fraud such as the falsification of records or disguise of the user. In this case, it is preferable to send the information to the authorized registration authority 1 and to analyze the troublesome and its cause.

Since the authorized registration authority 1 stores protected records that is difficult to invade or falsify from the outside, the records of the authorized registration authority can be compared with the data input at the authentication access terminal 4 to make it clear where the abnormal conditions occurred among the user authentication card 7, the end certification authority 3, and the policy certification authority 2.

If the contents of the user authentication card 7 do not match with the information input by the user 8, it should be considered that the user authentication card 7 got into wrong hands, such as a case where another person who is not the authentic user picked up or robbed the user authentication card 7, or where the data of the user authentication card was rewritten by unauthorized access.

The following section describes a second embodiment of a user authentication system according to the invention.

The user authentication system as practiced in the second embodiment differs from the first embodiment only in that the user authentication card has an operation function to check the biological individuality data of the user with the identity information recorded thereon, in stead of the use of the logical arithmetic unit provided at the authentication access terminal to check the biological individuality data input from the personal identity input unit with the biological individuality data recorded in the user authentication card. Referring here to the same drawings as used for describing the first embodiment, only the different portions from the first embodiment are described.

On an IC card used here as the user authentication card 7, certain elements such as the CPU 75 and RAM 76 can be mounted to have a certain operation function.

In the system of the embodiment, a user 8 who wants to receive services at an authentication access terminal 4 inputs his or her own biological individuality data through the user authenticating device 41. The biological individuality data are then processed accordingly, converted into digitized form, and sent to the user authentication card 7.

The user authentication card 7 stores the input information data into the RAM 76 temporarily. The CPU 75 then reads out the biological information data of the authorized user from the EEPROM 79, and compares the information data temporarily stored in the RAM 76 with the information data read out from the EEPROM 79. If the comparison shows that all the points of similarity between either information data are within an acceptable range, the person asking for services at the authentication access terminal 4 is authenticated as the true holder of the user authentication card 7, and the authentication access terminal 4 is notified of the acceptance. If the person has not passed in the authentication, the authentication access terminal 4 is notified of the refusal.

After accepting the user authentication result from the user authentication card 7, the authentication access terminal 4 offers desired services to the user 8. If more careful authentication is needed, the authentication access terminal 4 inquires the end certification authority 3 or the policy certification authority 2 to further authenticate the person in accordance with the authentication results from the upper authorities. It should be noted that the authentication access terminal 4 may be combined with the end certification authority 3.

Although the proportions of biological information data distribution among related spots can be determined arbitrarily, it is advantageous to allocate a higher percentage of biological information data for lower-level authentication as shown in the first embodiment. This makes it possible to reduce a communication load of the entire system, and hence to improve the system operability. It is therefore preferable to allocate the user authentication card 7 more than 60% of the biological information data.

In the embodiment, the system makes use of an intelligent IC card as the user authentication card 7 not only to reduce the calculation load of the user authenticating device 41, but to decrease the device cost as well. Therefore, the smaller cost for preparing the facilities at the authentication access terminal 4 lowers barriers for clients to join the system, thereby enhancing the availability.

Further, since all the information processing is completed inside the user authentication card, the authentication card can be provided with a readout prohibited area for recording important information as authentication data which prohibits any outside parties from access. This makes it possible to prevent secret information from leaking, and hence to improve security.

Figure 7:
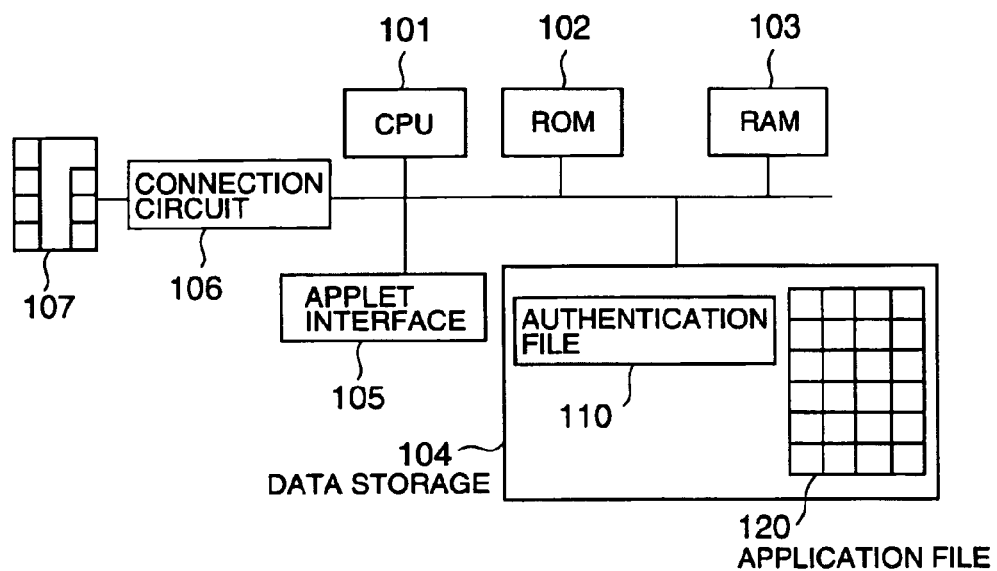
FIG. 7 is a block diagram of the third embodiment of an authentication IC card according to the invention.

A third embodiment of a user authentication card for use in the user authentication system of the invention is an authentication IC card using an IC card as shown in FIG. 7. In the embodiment, information stored in the IC card is offered only when the IC card has passed in all the required levels of authentication. In this case, the authentication IC card may store 100% of the authentication information and the user may not use any upper certification authorities.

In the embodiment, the authentication IC card includes a CPU 101 for information processing, a ROM 102 for storing an information processing program, a RAM 103 for storing operation data, a data memory 104 capable of writing and reading information, an interface 105 for an applet program, an external connection circuit 106, and an external connecting terminal 107.

Figure 8:
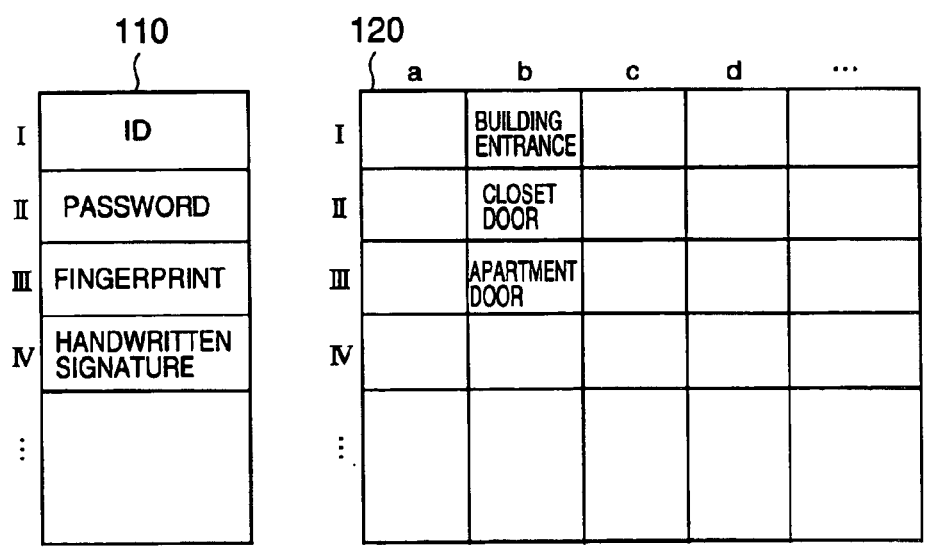
FIG. 8 is a block diagram illustrating the structure of files in the authentication IC card of the third embodiment.

As shown in FIG. 8, files in the data memory 104 include an authentication file 110 storing authentication data and an application file 120 storing information exchanged with the outside.

The external terminal 107, used for signal transmission and power supply, may be a non-contact type electrode or antenna. Alternatively, both of the contact type and non-contact type terminals may be provided for supporting various kinds of card readers.

The applet interface 105 accepts a small program (applet) from the outside and operates the CPU according to the program. The interface has a function to recognize that the accepted applet is harmless to the authentication IC card.

The authentication IC card may accept no applet for safety sake. In this case, the applet interface 105 does not need to be provided in the authentication IC card.

Stored in the authentication file are personal identity information for use in recognizing the authentic holder of the authentication IC card as well as the data for proving the authentication IC card to be authentic. Plural levels of authentication data are recorded in the order of steps I, II, III ... from the simplest to the highest level authentication step. The identity information preferably includes personal secret information and biological information difficult for others to reproduce, such as a password, a fingerprint, a voiceprint, a portrait, and a handwritten signature.

The application file 120 is divided according to the first classification related to information types and the second classification related to authentication levels. The first classification includes subclasses a, b, c . . . , in which the information is normally classified according to the types of institutions offering authentication services, such as housing management information, medical information, financial information, and communication information. The second classification includes subclasses I, II, III . . . , in which the authentication information is classified according to the required levels of authentication, i.e., according to the depths of authentication, ranging from a case where a person is allowed to access by the easiest authentication to a case where the access is allowed only when the person has passed in such high-level authentication as to identify the person based on his or her fingerprint.

For example, a series of relevant information are recorded as follows: information sent from building management companies is stored in section b of the first classification; codes to permit entry to apartment buildings are in Class I file; codes to open or close closets are in section II of the second classification; and codes to open doors of individual apartments are in the file of the section III of the second classification.

These files may also record keys of codes, electronic certificates, and so on.

In this case, a card reader is installed in each entrance of apartment buildings. When getting in the apartment building, tenants have to get their authentication IC card read in by the card reader. The tenants are allowed to enter the apartment building when the IC cards are judged to be authentic as a result of mutual checking between the card and the card reader. Since each apartment in the building has a strictly locked door, the tenants are permitted to enter the building merely through an easy authentication step to authenticate the authentication IC card only.

The authentication IC card has a function to confirm the authenticity of the card reader. It is essential to prevent an unauthorized card reader from stealing secret information written in the authentication IC card or from rewriting the information contents.

Figure 9:
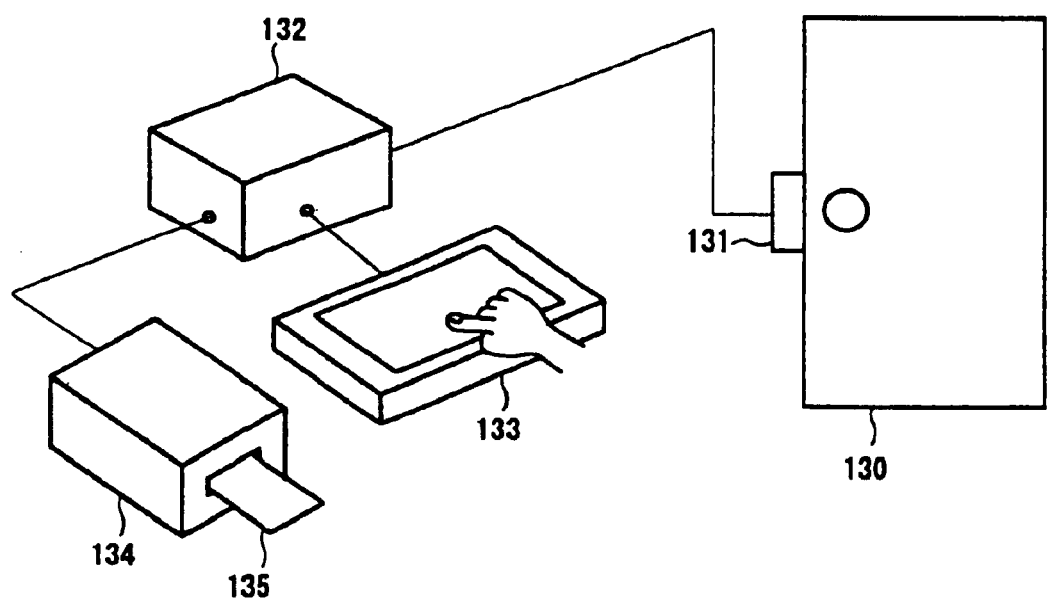
FIG. 9 is a block diagram illustrating an example of usage of the authentication IC card of the third embodiment.

FIG. 9 is a block diagram illustrating typical application of the authentication IC card to housing management.

Each apartment door 130 is furnished with a door open/close control unit 131 which prevents the door 130 from manual opening. The door open/close control unit 131 is connected to an authentication control unit 132; the door open/close control unit 131 opens or closes the door 130 in response to a control signal from the authentication control unit 132. The authentication control unit 132 is connected to an identity information input unit 133 and a card reader 134.

Figure 10:
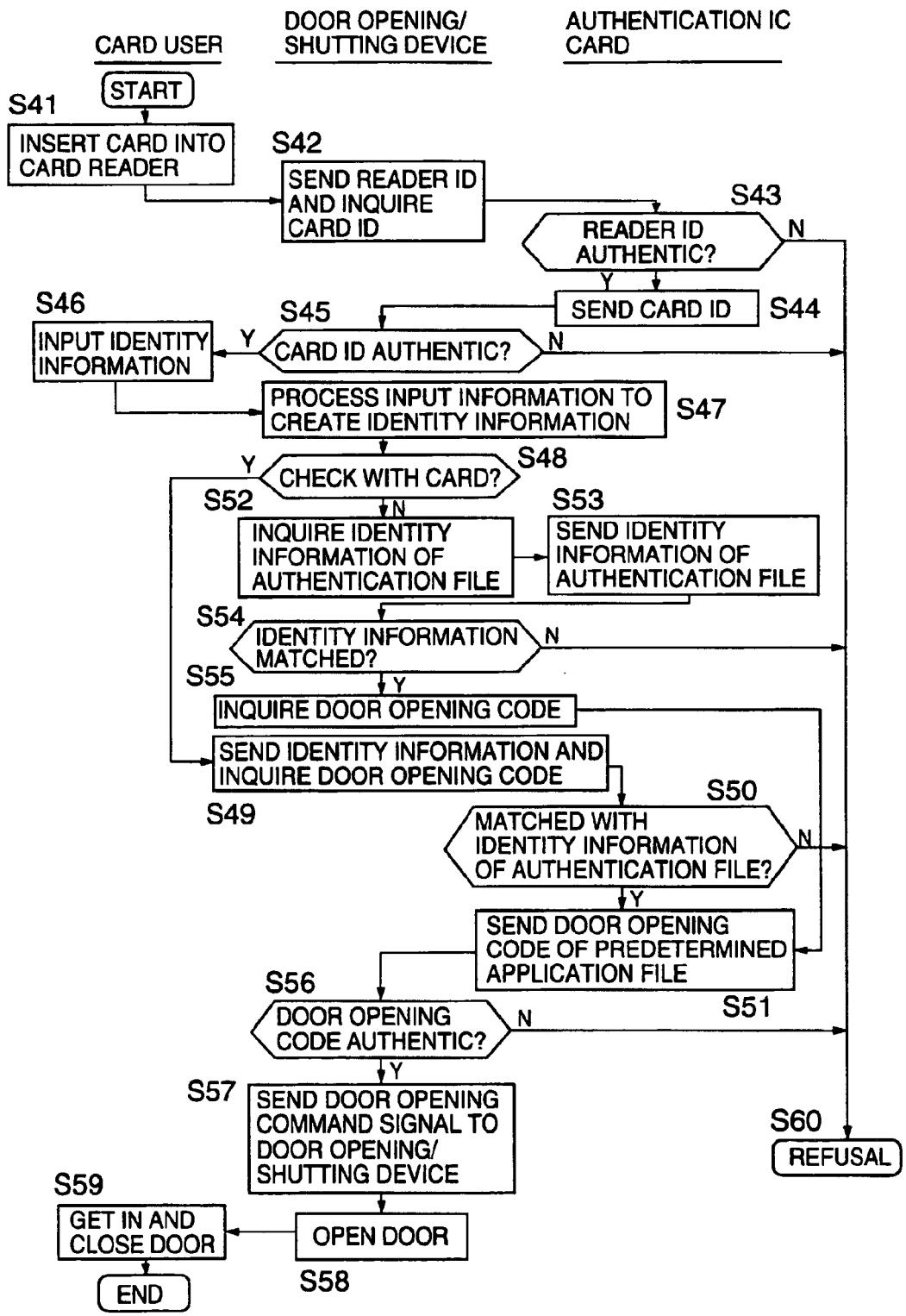
FIG. 10 is a flowchart illustrating the usage of the authentication IC card of the third embodiment.
Figure 11:
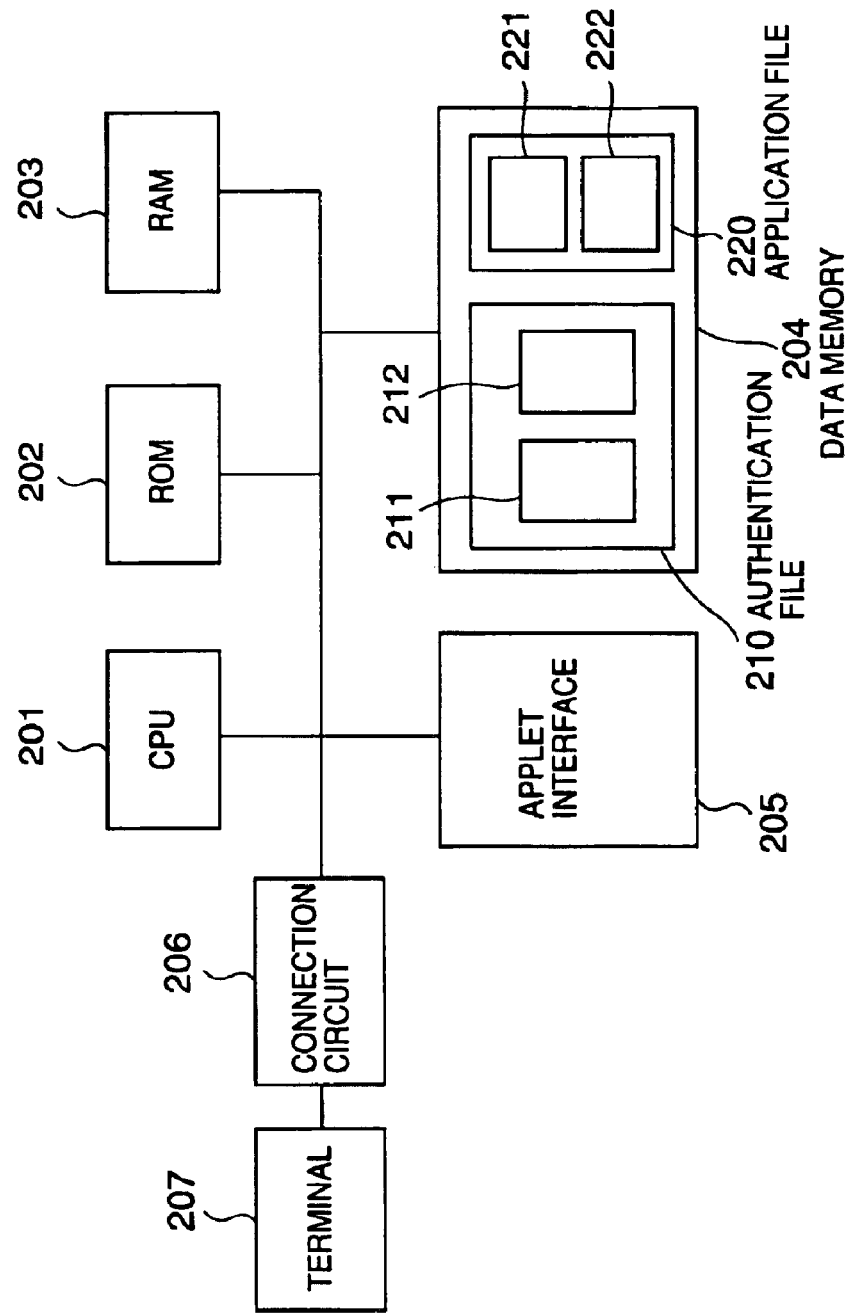
FIG. 11 is a block diagram illustrating a configuration of an authentication IC card as practiced in the fourth embodiment of the invention.

The following section describes, along with the flowchart of FIG. 10, the information processing with the authentication IC card.

When getting in user's apartment, a card user insets his or her authentication IC card 135 into the card reader 134 (S41). The authentication control unit 132 sends a reader ID to the authentication IC card 135 and inquires the card ID from the authentication IC card (S42). The authentication IC card 135 examines the reader by checking the reader ID with information in the authentication file, and if it confirmed that the reader is permitted to deal with the card itself (S43), the card ID recorded in the authentication file is forwarded to the card reader 134 (S44). These processing steps are all performed via the CPU; the card reader 134 cannot access the memory in the authentication IC card hereon.

The authentication control unit 132 then judges whether the ID of the authentication IC card is authentic and acceptable to the system (S45). When the card is judged net to be acceptable, the unit eject the card and refuse it (S50). If judged the card to be acceptable, the authentication control unit 132 requires the user to input a personal identification, such as a fingerprint, predetermined based on the authentication level, reads out the information input by the user from the identity information input unit 133 (S46), and extracts necessary information from all the input information to create identity information (S47).

Then, the authentication control unit 132 determines whether the authentication IC card or the door open/close control unit confirms the authenticity of the identity information (S48). If it is predetermined that the authenticity is confirmed by the authentication IC card 135, the authentication control unit 132 sends the identity information to the authentication IC card 135, and inquires a door opening code from the authentication IC card 135 (S49).

The authentication IC card 135 checks the received identity information with the identity information stored in the authentication file (S50). If both accord each other, the authentication IC card 135 sends the door opening code recorded in a predetermined application file (e.g., b III file), to the authentication control unit 132 through the card reader 134 (S51).

On the contrary, if the authenticity of the identity information is to be confirmed by the door open/close control unit, the authentication control unit 132 inquires the identity information from the authentication IC card 135 (S52), and checks the identity information sent from the authentication IC card 135 against the identity information of the user obtained on the spot (S54). If the checking result is acceptable, authentication control unit 132 inquires the door opening code from the authentication IC card 135 (S55). In response to the inquiry, the authentication IC card 135 sends the door opening code recorded in the predetermined application file, to the authentication control unit 132 (S51).

If the door opening code thus received is authentic (S56), the authentication control unit 132 sends the door open/close control unit 131 a door opening-instruction signal (S57) to unlock the door 130 (S58) so that the holder of the authentication IC card can get in (S59).

The identity information may be divided between the authentication IC card 135 and the authentication control unit 132 so that the memory area of the data memory 104 in the authentication IC card 135 can be reduced. In this case, the door opening code is delivered after checking the identity information input from the identity input unit against the identity information dividedly stored in the authentication IC 135 card and the authentication control unit 132. The dividing of the identity information between the authentication IC card 135 and the authentication control unit 132 is effective not only in memory economy, but also in security measures because others cannot be certificated by the identity information stolen from the authentication file of the authentication IC card.

In the above example, the identity information stored in the authentication file is used in three steps, but the number of steps may be arbitrarily selected. The identity information may include from the easiest step of information as an ID number written in by the card issuer, to passwords given by the card holder, information on the living body such as a fingerprint, an iris, and a portrait of the holder, dynamic information such as a signature input by the holder on the spot, and high-level composite information made up of a combination of the above kinds of information.

The biological information shows hard-to-duplicate features because the authentic holder has it biologically on the living body, but the information data itself can be duplicated to misappropriate. In contrast, the dynamic information accompanied with person's movement on the spot makes it more difficult for others to imitate, thereby improving reliability of the authentication.

The identity information input unit must include various functional parts for obtaining information depending on the kinds of identity information to be used, for example, a graphic input part for signatures, a keyboard for passwords, a fingerprint acquisition part for fingerprints, a judging part with a camera for taking pictures of pupils in case of using iris patterns.

It may also be necessary for the holders themselves to specify the depth of authentication in such cases as to access the individual information stored in the IC card, or to ask for disclosure of medical records at a hospital. For example, if a holder want to use different depth of authentication between getting a resident card and a certificate of tax payment, the holder can specify each depth of the authentication of the application file storing respective passwords used in asking for respective certificates.

It is also apparent that the importance of personal authentication differs in depth between payment for medical treatment fee and reception of telecommuting medical treatment. The authentication IC card of the invention can respond to even these cases.

Further, a single authentication IC card may be used for plural purposes, for example, as a member's card, an personnel's card, an ID card for administrative services, a commuter's ticket, a prepaid card, a credit card, a telephone card, a shopping card, and an electronic-cash card capable of updating the balance of the holder's debit account.

Furthermore, the authentication IC card can be for temporary use such as to record a door opening code of a hotel room in a file of the authentication IC card at check-in and erase it at check-out.

A forth embodiment of a user authentication card used in the user authentication system of the invention features that a guarantee or witness is added as a target to be authenticated with the authentication IC card as shown in FIG. 1.

As similar to the authentication IC card of the third embodiment, the authentication IC card of the this embodiment includes a CPU 201 for arithmetic processing, a ROM 202 for storing an arithmetic processing program, a RAM 203 for storing data used in the arithmetic processing, a data memory 204 capable of writing and reading data, an interface 205 for applet programs, an external connection circuit 206, and an external terminal 207.

Files in the data memory 204 include an authentication file 210 storing authentication data and an application file 220 storing job programs for executing specific jobs and various data.

The authentication file 210 stores data used for proving the authentication IC card to be authentic and identity information of an authentic holder. The authentication information is not limited to one type, but plural types of authentication information can be stored in order to selectively use a single identity information alone or a plurality of information in combination.

The authentication file 210 is divided into a first identity file 211 storing identity information that proves the holder to be authentic by the authentication IC card, and a second identity file 212 storing identity information related to the second person such as a guarantee, witness or issuer, or authentication information related to the second organism. Two or more witnesses of the second persons or organisms may be used as required in the system.

The application file 220 includes a first work file 221 storing part of information for dealing with the authenticity of the authentication IC card and a second work file 222 storing part of information for performing execution based on the authentication results.

The second work file 222 stores information required for each service provider using the authentication with classifying the information according to the levels of the required authentication. The file can also store keys of codes, electronic certificates, and so on, or may store various programs such as one for an undo-a-lock instructing job.

The first work file 221 stores various jobs and information related to the authenticity of the authentication IC card, such as jobs for writing identity-information, jobs for reading/rewriting identity-information, and jobs for reading/erasing logs.

The jobs and information stored in the first work file 221 can be divided, based on the required levels of confidentiality, into a group requiring authentication of the holder only, a group requiring authentication of the second person only, and a group requiring authentication of the holder and the second person.

Figure 12:
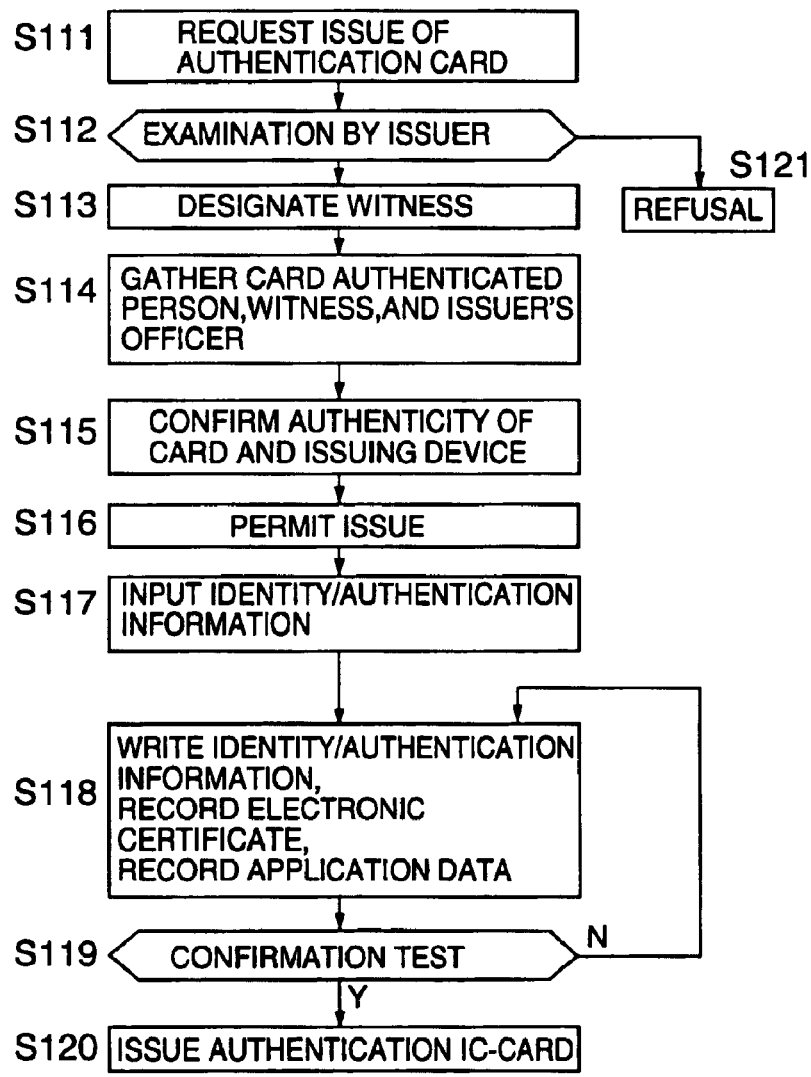
FIG. 12 is a flowchart illustrating the process of issuing the authentication IC card of the fourth embodiment.
Figure 13:
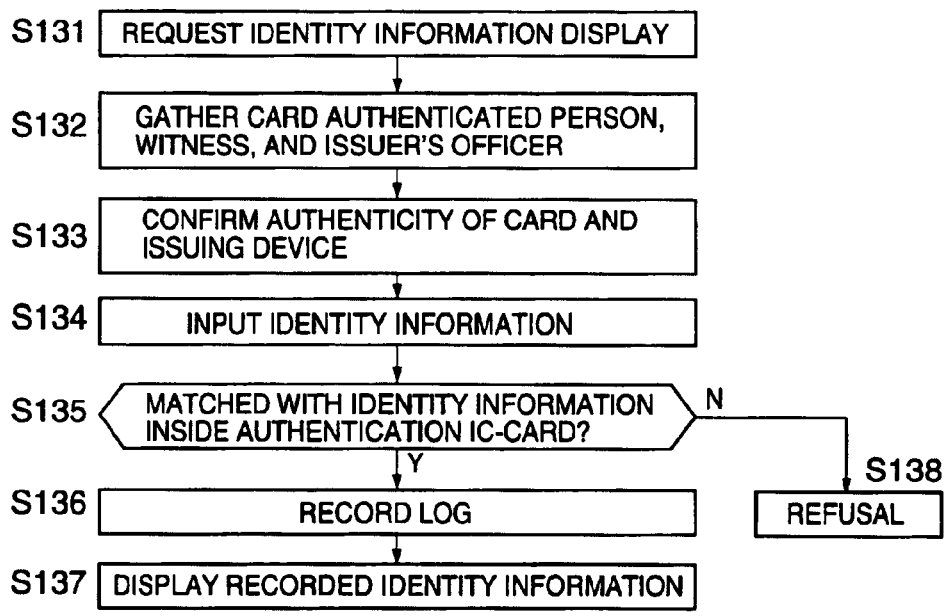
FIG. 13 is a flowchart illustrating the process of reading out identity information recorded in the authentication IC card of the fourth embodiment.
Figure 14:
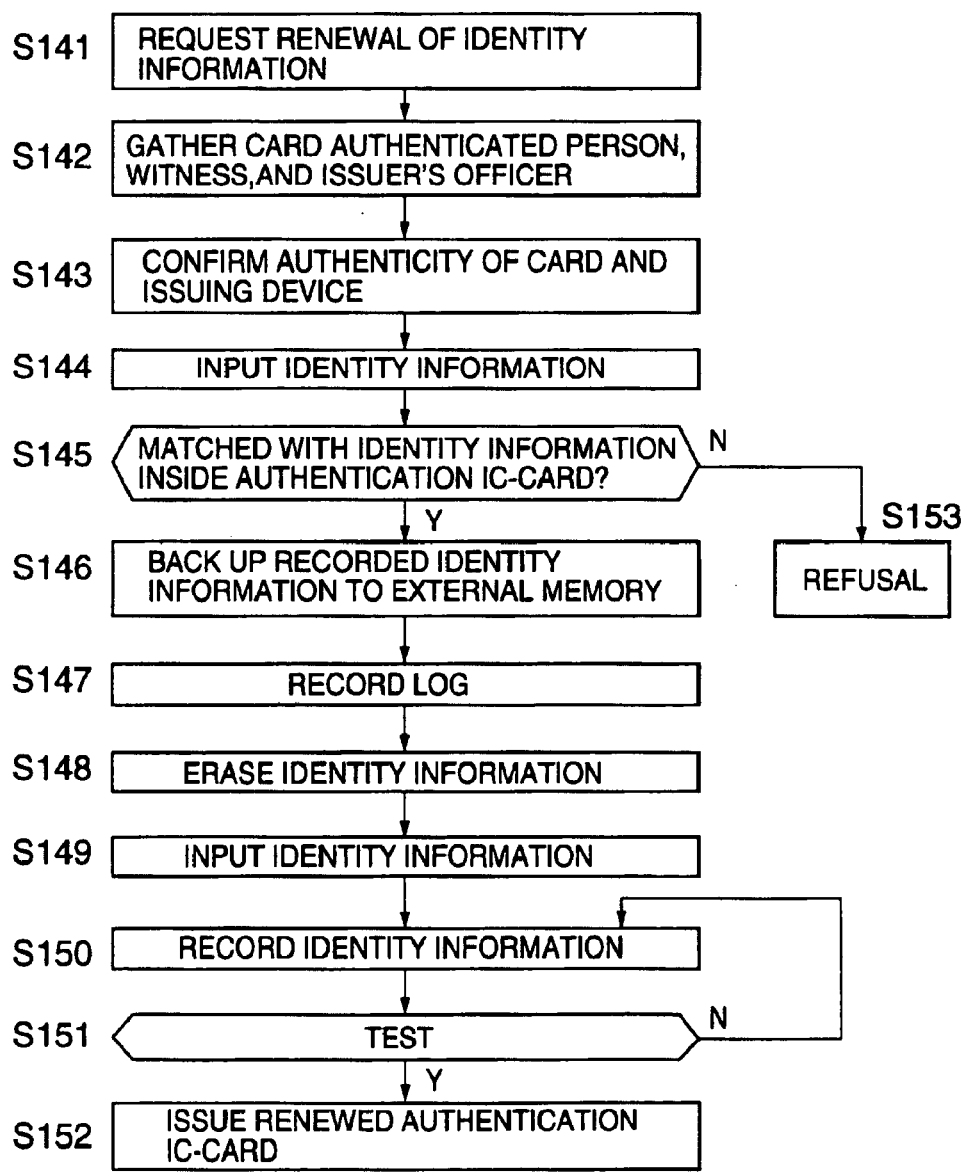
FIG. 14 is a flowchart illustrating the process of rewriting or renewing the identity information recorded in the authentication IC card of the fourth embodiment.

The following section describes application of the authentication IC card of the embodiment with reference to FIGS. 12 to 14.

FIG. 12 illustrates the process of issuing the authentication IC card.

Upon receipt of a request for the issue of an authentication IC card (S111), the card issuer checks credit of the applicant to be authenticated by the authentication card (S112). If the applicant passes in the checks and is certified to use the authentication card, the card issuer requires the authenticated person to designate someone credible as a witness (S113).

Upon issue of the authentication IC card, all the persons concerned gather at a specific card issuing station (S114). At first, the authentication IC card and the card issuing device are confirmed to be authentic (S115), and if the authentication IC card is permitted to be issued (S116), the respective persons input identity information (S117).

The function to confirm the authenticity of the card reader is provided in the authentication IC card in order to prevent the contents of information stored in the authentication IC card from getting stolen or rewritten.

The person to be a card-holder inputs several identity information, such as passwords, specific signs or marks, signature, fingerprints, a voiceprint, an iris pattern, a palmprint, and so on, so as to use selectively depending on the degree of the credibility required in respective transactions through the card. Witnesses may also be required to input plural pieces of identity information, but since there are few cases where the witnesses are authenticated, it is not necessary for them to use various identity information. The witness may be an organism as an organization or institution. In this case, the authentication of the witness may be executed based on certification information as an electronic signature instead of the biological information.

The authentication IC card may be used in a company for confirming various authority powers. In this case, a manager in the personnel department responsible for issue of cards or a person in charge of issuing cards may be authenticated as the card issuer or witness, or a manager in a department to which the card holder belong may be authenticated.

The input data of identity information of the holder is stored in the first identity-information file 211; the identity information or certification information of the witness is stored in the second identity-information file 212. An electronic certificate describing the reliability and evidence of the authentication may be required in the authentication process. Such an electronic certificate to be issued by the authentication IC card is stored in the second work file 222 of the application file 220 together with the application data for use in various transactions (S118).

Programs for displaying or rewriting the identity information recorded in the authentication IC card is stored in the first work file 221, and access to the program is permitted only after being satisfied with all the steps of authentication predetermined according to respective jobs.

After the above required information has been written in the authentication IC card, the issuer's officer tests the authentication IC card on the perfection of product such as to confirm that the authentication IC card operates properly when the authenticated person inputs proper identity information (S119). If the authentication IC card has passed in the test, it is issued to the card holder (S120). If not passed in the test, necessary steps such as the authentication information writing step (S118) is repeated so that the authentication IC card can be repaired and getting good enough to issue the card holder.

Upon the pre-qualification of the authenticated person (S112), if the card issuer judged the person to be ineligible to use the card in the authentication system, the issue of the authentication card is refused (S121).

This type of authentication IC card can be used in a mechanism in which a code signal for permitting each service or transaction (hereinafter, referred to as transaction) is prerecorded in the authentication IC card carried by a person who has qualified to do the transaction, and the transaction is permitted by confirming that the person carrying the authentication IC card is the authentic holder.

In this case, the person in charge of the transaction receives information from the authentication IC card to confirm that the person carrying the authentication IC card is the authentic holder and that the code signal proving the eligibility of the authentication IC card to receive the transaction is recorded. On the other hand, the authentication IC card confirms that the reader is authentic and the person carrying the card is authentic holder.

Since the authentication IC card stores attributes of the holder, authentication functions for all the qualified transaction utilization can be incorporated in one card, including entrance into a building or morgue, a bank account or holding a credit card, a family register or history, balance of a debit account in case of using an electronic-cash card.

Such an authentication IC card can be used for managing entrance into housing in the same manner as in the third embodiment, and in this case, this embodiment offers highly reliable authentication hard for others to pretend the card holder.

The authentication IC card chooses some of various kinds of the identity information depending on the situations, and this may cause even the authorized holder to forget the genuine identity information to be used on the spot. To avoid such inconvenience of not being able to use the card, the identity information recorded in the card can be shown, in general.

Further, the holder may periodically change the identity information to prevent from leaking or getting stolen by others, or to improve security. It is therefore preferable that the identity information is changeable as required by the card holder.

It is not easy to prevent a person having profound knowledge about the authentication IC card and operation of the equipment from evilly withdrawing information stored in the authentication IC card and falsifying the card or making false authentication IC cards.

To prevent such cases, the authentication IC card of the embodiment requires the authentication of a witness for predetermined jobs. If the authentication of a witness is required at the time of access to the authentication information of the authentication IC card, even the person who is well-informed about inside information cannot steal or rewrite the identity information.

FIG. 13 is a flowchart illustrating the procedures required when an authorized person to be authenticated confirms his or her own identity information.

When the identity information of an authenticated person is read out from the authentication IC card (S131), the authenticated person concerned, the person to be authenticated, the witness at the card issue, and the person in charge at the card issuing station, or the organism of the organization assemble themselves (S132), and after confirming of the authenticity of the card (S133), they input respective identity information or authentication information (S134).

If the identity information or the authentication information of respective persons or organism match with those stored in the authentication IC card (S135), the fact of current access to the card is logged up into the memory of the authentication IC card (S136), then the recorded identity information is displayed on a display attached to the card reader (S137). If all the necessary information such as the identity information do not match with each other, the current access is regarded as ineligible, and the display of the identity information is refused (S138).

In this case, the card-authenticated person inputs one type of the identity information that he or she remembers, and if the input identity information matches with a corresponding information stored in the authentication IC card, the current access is regarded as eligible. In another possible case, an identity information is shown only when the identity information to be displayed is authenticated by a higher-level of the identity information. For example, when an authenticated person cannot remember the password, the forgotten password is disclosed by referring to the fingerprint, while a signature is not to be displayed even if the password matches with that recorded in the authentication IC card.

The identity information not requiring a high level of security may be disclosed merely by identifying only the card holder using the identity information based on the biological individuality of the holder, without assembling the witness or the like. Further, in specific cases, the person in charge of issuing the card can take responsibility for reading out certain information at his or her discretion.

FIG. 14 is a flowchart illustrating the procedures when the identity information is renewed or rewritten.

When the authenticated person requests the issuer to renew or rewrite the identity information (S141), the witness and the person in charge of the issuer gather together with the authenticated person (S142) to confirm the approval of all concerned. This is because if renewal of the identity information is accepted by approval of only the authenticated person, there is a possibility that an unauthorized person renews the identity information to use the card illegally. After extracting the approval from all concerned, the authentication IC card and the issuing device confirm each other on their authenticity (S143), and all the persons gathered together input respective identity information or authentication information (S144). If the input of the identity or authentication information matches with that stored in the authentication IC card (S145), the renewal of the identity information is permitted.

When all persons pass in respective authenticity, the identity information formerly recorded in the authentication IC card is transferred to an external memory (S146), and logs of being renewed or rewritten are recorded in the authentication IC card (S147). Further, unnecessary old identity information data is erased (S148), while the card holder inputs new identity information (S149). The new identity information data is then stored in the authentication IC card (S150).

After that, the issuer's officer tests the authentication IC card on the functions (S151). If the authentication IC card has passed in the test, it is issued to the card holder (S152). If authentication IC card is defective, the identity information is renewed again, and the authentication IC card is issued to the card holder when the card passes the test.

If anyone of the persons concerned fails in the authentication, renewal of the identity information is refused because there may be an unauthorized access (S153).

When the identity information is read out or rewritten, it may be a cause of abnormality such as unauthorized use of the card. It is therefore preferable to record logs on the authentication IC card itself.

The authentication IC card of the embodiment can require the approval of a witness or the like for read-out or renewal of the identity information, so that not only others who picked up or robbed the authentication IC card cannot use or falsify the authentication IC card, but also someone having profound knowledge about the authentication IC card issuing device, the reader, and the rewriting device cannot use the authentication IC card without the approval of the witness. The authentication IC card thus offers a superior level of security.

The user authentication system and the authentication IC cards according to the invention are applicable to a lock control system.

A first embodiment of a lock control system according to the invention is the application of the authentication system to safe-deposit box control. In the embodiment, the authentication data registered in the authentication IC card is used to identify the user, and this makes it possible to offer a high level of security.

Figure 15:
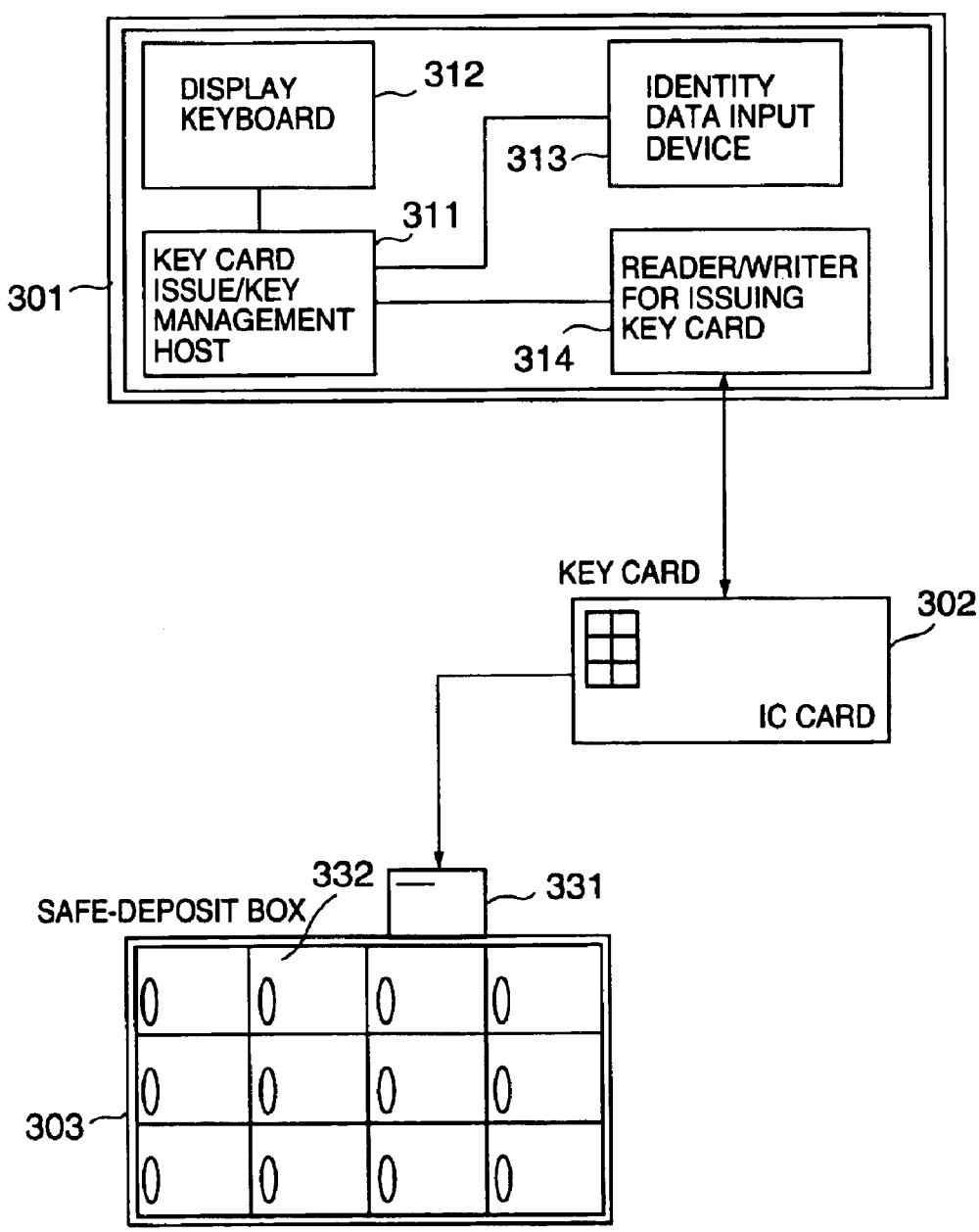
FIG. 15 is a block diagram illustrating the first embodiment of a lock control system according to the invention.

Referring to FIG. 15, a key card issuing station 301 issues a specific IC card as a key card 302 to a user who applies to use a safe-deposit box. A safe-deposit box 303 reads out the key card 302 and authentication data of the user, and when the key card 302 passes in the authentication, it unlocks the safe box designated by the key card 302.

The key card issuing station 301 is furnished with a host computer 311, a data input/output device including a display and a keyboard, an identity data input device 313, and a reader/writer 314 for issue of key IC cards.

When a user applies for a safe, the key card issuing station 301 has the user input the identity data from the identity data input device 313. The identity data are used to authenticate the user.

The host computer 311 has key-card issuing software, key-control software, and authentication-data registering software in its software configuration. The key-control software grasps the current usage situation of the safe boxes, makes a safe correspondent to the key card, manages safe levels of locks and specifies the kind of authentication data, as well as it manages the card issue and return situation and erases the recorded contents of a returned key card securely.

The data input/output device 312 includes a display, a keyboard, a printer, and something like that, generally required in a computer system.

The identity data input device 313 is a device for inputting information by which the user can be identified, which may include a fingerprint reader extracting a fingerprint pattern of a finger pressed thereon and classifying it, a voiceprint recognizing device consisting of a microphone and a voiceprint analyzer, and a tablet for writing a signature or signal code. In the simplest case, only a keyboard may be provided for entering a character string of code.

The reader/writer 314 for issuing key-cards is constituted of an IC card reader/writer and a command for the IC card reader/writer.

The key-card issuing station 301 designates a safe for rent, stores an authorized ID allowing use of the safe and the authentication data of the individual user obtained at the identity data input device 313 into a memory area that operates under control of a CPU in the authentication IC card, and issues and gives the authentication IC card as a key card 302 to the user.

The key card 302 is an IC card having a CPU and a built-in memory thereon.

The safe-deposit box 303 is provided with an undo-a-lock processing device 331 having an IC card reader/writer and an identity data input unit, and a plural number of locker-type safe boxes 332. The undo-a-lock processing device 331 has safe control interface and authentication data checking software. Each safe box 332 is equipped with an electric controller; it is locally operated to lock or unlock.

Abnormality sensors for detecting abnormal situation and an alarm for alerting the abnormality may be provided to ensure security in an unmanned system.

The user of the safe-deposit box stores things in a safe box 332 assigned to the user among the safe boxes in the safe-deposit box system 303. The user then locks the safe box. Once the safe box is locked, the safe box can be unlocked via the undo-a-lock processing device 331 only when the identity data input by the user on the spot is judged to be within an acceptable range in checking theory that recognizes it matches with the authentication data read out from the key card 302 presented by the user.

According to the control system, even if the key card 302 is authentic, the safe box cannot be unlocked without authenticating the person carrying the card. Thus, the safe-deposit box offers a high level of security, and the control system does not need the approval of any witness such as a superintendent. It is therefore possible to run the safe-deposit box in an unmanned control system or the like.

The system can also use plural kinds of authentication information to selectively set safe levels of the safe boxes. When safe levels are selectable, the user of the safe-deposit box can select authentication information to be used in consideration of the value of things to be stored in the safe box and the ease-of-use. The user may be identified by his or her signature if requiring a superior level of security, or identified merely by a character code if selecting a quick and easy way.

Further, the system can combine more than two kinds of information into the information to be checked at a time, and this makes possible much safer type safe boxes.

Furthermore, a safe box may be assigned at the time of issuing a key card 302, and an ID code corresponding to the assigned safe box is entered into the IC card at the same time. In this case, even if unused IC cards got stolen, there is less danger of illegal use.

The same lock control system is also applicable to other storage facilities to which plural persons access, such as integrated type safe boxes or lockers, or key boxes in a building management system.

A second embodiment of a lock control system according to the invention is the application of the authentication system to storage control. In the embodiment, a person is identified by checking the IC card and his or her handwritten signature, and only the person permitted can enter a storage and take out only the permitted things. In the storage, important things, medicines, strong medicines, poisons, and so on are safely stored.

The system has various functions for enhancing the security and reliability of storage such as a sensor notifying of unauthorized person's accessing to the storage and circuitry to switch the lock to the security side of the system against attacks from the outside.

Figure 16:
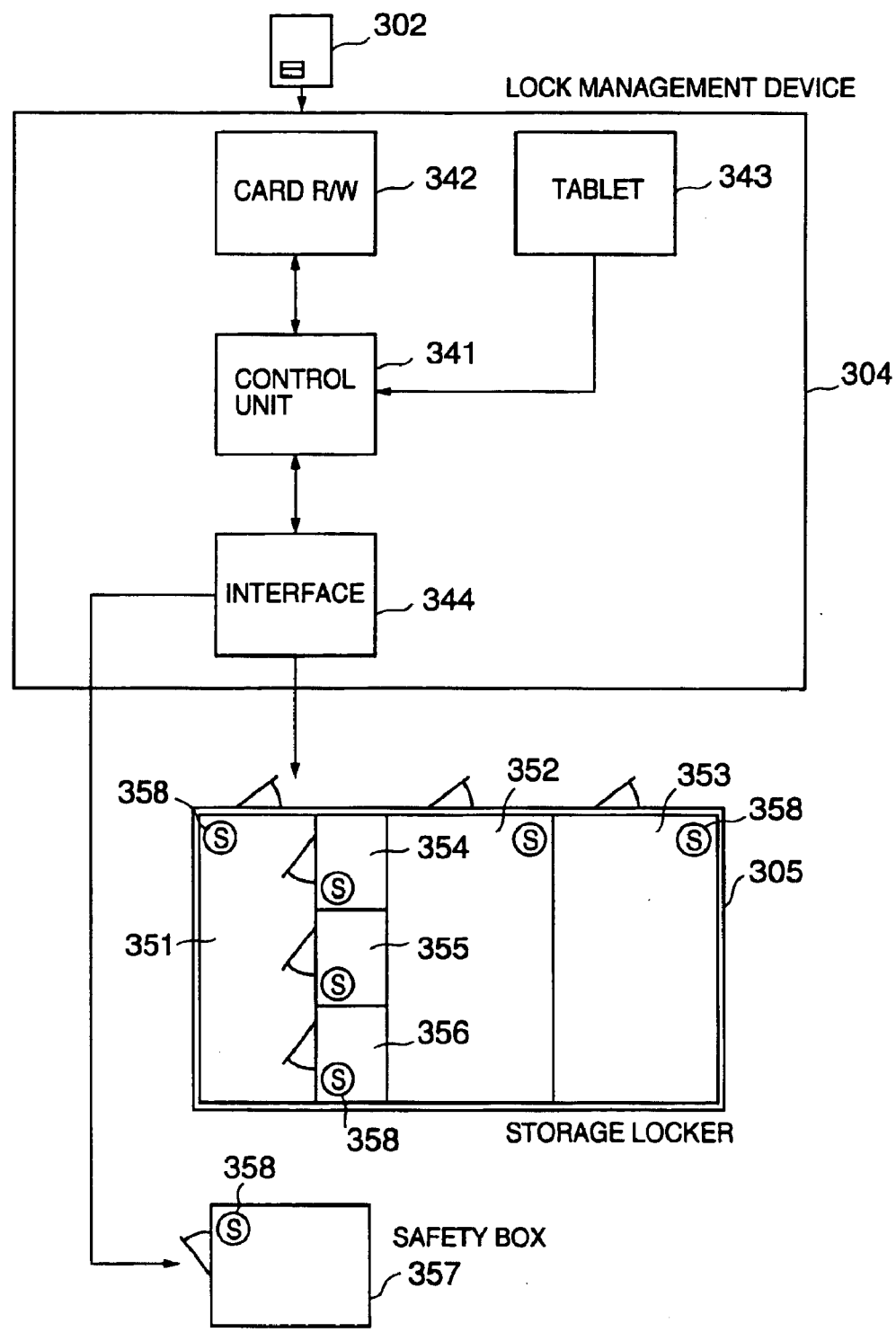
FIG. 16 is a block diagram illustrating the second embodiment of a lock control system according to the invention.

FIG. 16 is a block diagram of a lock control system applied to a storage.

A storage 305 is partitioned into plural storage rooms 351, 352 and 353. The storage room 351 has small rooms or storage lockers 354, 355 and 356.

The plural storage rooms and small rooms are different from each other in security level; they can be selectively used according to the confidential levels of stored things.

Taking a specific case as an example, a company has the storage 305 in which the first storage room 351 stores such confidential documents that part of members of the company can enter the room and handle them. Of the confidential documents, the most confidential ones are stored in the first small room 354 in the first storage room 351, and only a few members further selected out of the ones allowed to enter the first storage room 351 can access to the first small room 354. The second small room 355 is, for example, a room for personnel documents, and only the persons in charge of the personnel department are permitted to access the second small room 355. The third small room 356 is a room for accounting documents so that only the persons in charge of the accounting department can access thereto.

The second storage room 352 is a room for storing materials relevant to development projects that need to be prevented from leaking the relevant information to the outside. Therefore, only the persons in the department concerned are allowed to enter the room. On the other hand, the third storage room 353 is a room for storing documents that is relatively low in importance, so that any personnel can enter the room, but going in and out of the staff is recorded.

The same system can be applied to an independent storage such as a safe box 357.

As similar to that in the first embodiment, the storage control system of the embodiment sets qualifications for entering each storage room or small room, and issues IC cards as key cards 302 to only the qualified staff. Thus, the staff qualified by authenticating personal identification based on the key card 302 can unlock the room allowed.

In other words, the key card 302 stores, in its storage area operable under control of a CPU in the IC card, information designating a lock which is allowed to access and personal authentication data which is obtained and processed by the identity data input device.

The storage 305 is also furnished with a lock control device 304 that includes an IC card reader/writer 342 for reading out the key card 302, a tablet 343 as an identity data input device, a control unit 341 capable of exchanging information, and an interface 344 for controlling locks in each storage partition.

The storage rooms 351, 352, 353, the small rooms 354, 355, 356, and the door of the safe box 357 are equipped with electric locks operable under local control of the lock control device 304. Each door is also equipped with an abnormality sensor 358 that detects access to the room and sends a signal to the lock control device 304.

Indication lamps may be equipped with the doors and the lamps light to instruct the accessing person which doors are permitted to open.

When entering the storage 305, the user inserts the key card 302 into the card reader/writer 342, and inputs, by means of the tables 343, a code that the user has determined at the time of registration. The control unit 341 confirms that the key card 302 is the authentic IC card and which lock the key card 302 corresponds to by referring to the contents of the records sent from the key card 302 through the CPU.

Then, the identity information such as a signature input from the tablet 343 is checked with the personal authentication data presented from the key card 302, and judged to be identical or not. If the authentication data checking software confirms that both accord, the user is judged to be a person who has access to the lock specified by the key card 302, and the designated lock is released.

If the user tries to access areas beyond the control area allowed, the sensor operates to issue an alarm. In case of unauthorized access, the area may be automatically locked so that the person who got unauthorized access is trapped in the room.

Further, to prevent well-intentioned persons from getting access to incorrect area by mistake, indication lamps may be provided at the locks, the room or shelves so that when a lock is allowed to release based on the key card 302, a corresponding indication lamp is lit.

The depth of authentication can be predetermined according to the level of security for each room. The room may requires such a level of security as to allow the access merely by presenting the key card 302, or may require an input code to be equal to the recorded code in shape, stroke order, and stroke pressure. Further, the room may require a higher level of evidence such as a combination of password and signature.

In response to these different levels of security, plural kinds of authentication information data may be stored in one key card 302 so that a corresponding data of authentication information will be read out and checked for each lock to be accessed.

Alternatively, different kinds of identity data input means can be provided in the storage 305 so that one of the identity data input means can be selected according to the required level of authentication. In general, since the authentication information corresponding to high levels of security take much time and effort, locks that do not require such high levels of security may be released in an easier authentication manner for the users' convenience.

Further, accurate authentication information is selected out of plural kinds of information data, and this makes it easy to eliminate unauthorized access. If the user can select the combination of the identity data, the security of authentication is further improved, and this makes is more difficult for others to pretend the user.

Furthermore, since in the control system each person's access to locks can be grasped securely in an individual base, it is possible to automatically record who accesses to, when and which storage room (or storage shelf) the person accesses to.

In blackout situations or during power-down, the system is to be locked on the security side to ensure the confidentiality of information. It is preferable to provide a mechanism for giving the alarm to the control room when an abnormal condition occurs such as an act of vandalism against the storage.

It is also preferable to provide a superintendent's level of authentication to allow the superintendent to undo the lock in case of emergency.

Although the embodiment described the example of document management, the same mechanism is applicable to a medicine storage and medicine cabinets or lockers in which medicines are manageably stored according to the risk factors.

INDUSTRIAL APPLICABILITY

As described above, the user authentication system according to the invention checks identity information directly input by the user at the authentication access terminal with biological individuality data stored in the authentication card. Then, when a higher level of authentication is required, part of the identity information is sent to the upper certification authority for authenticating personal identification. Thus, most of information processing steps are performed at the authentication access terminal without heavy loads on the communication channels, so that user authentication can be obtained according to the required level of security. Further, the identity information can be divided, and this makes it possible to establish a user authentication system highly resistant to attacks.

The authentication IC card according to the invention accesses information through the CPU, so that authority power for accessing files can be arbitrarily sets, thus unauthorized accesses are prevented by making use of the identity information. It is therefore possible not only for the card holder to protect his or her privacy, but also for service providers to offer safe transactions. Further, when using many services, the user can reduce the number of carrying cards.

Furthermore, the authentication IC card according to the invention can require the approval of a second person at the time of issue, so that there is less danger of piracy, thereby enhancing the security.

The lock control system according to the invention authenticates authorized persons properly to offer a high level of security. This makes it possible to establish a storage management system or safe-deposit box control system safer than that in the conventional.

What is claimed is:

1. A user authentication system, comprising:
   a registration station provided with an information acquisition device for obtaining biological individuality data for distinguishing individuality of a user;
   an authentication card issuing station that issues to the user a user authentication card recorded with a divided part of the biological individuality data;
   an authentication access terminal provided with an authentication-card reader for reading the information of the user authentication card and an identity acquisition device for inputting biological individuality data of the user; and
   at least one certification authority that is connected to the authentication access terminal through an information communication channel,
   wherein the certification authority holds the record of the remaining part of the biological individuality data that has been obtained at the registration station but not recorded in the user authentication card,
   compares the biological individuality data of the user obtained at the authentication access terminal with the part of the biological individuality data missing in the user authentication card in response to inquiry from the authentication access terminal, and sends the comparison result to the authentication access terminal for authentication, and
   wherein the at least one certification authority dividedly records the remaining part of the biological individuality data obtained at the registration station but not recorded in the user authentication card, and the at least one certification authority compares the biological individuality data of the user input at the authentication access terminal with the part of the biological individuality data stored in the certification authority in response to an inquiry from the authentication access terminal or other certification authority for further authentication.

2. A system, comprising:
   an authentication card including a first portion of a first biological individuality data, wherein said first biological individuality data is divided into at least first and second portions;
   an authentication terminal adapted to collect a second biological individuality data and communicate with said authentication card to read said first portion of said first biological individuality data;
   a certification authority adapted to communicate with said authentication terminal, wherein said certification authority includes said second portion of said first biological individuality data, and wherein said first and second portions of said first biological individuality data contain different information from within said first biological individuality data; and an authentication device which compares said first biological individuality data from said authentication card and said certification authority to said second biological individuality data, wherein if said first and second biological individuality data match, authentication is verified.

3. The system of claim 2, wherein said first portion of said first biological individuality data comprises less than 100% of said first biological individuality data, and wherein said second portion of said first biological individuality data comprises the remainder of said first biological individuality data.

4. The system of claim 2, further comprising a policy certification authority, wherein said policy certification authority includes a third portion of said first biological individuality data, wherein said first, second and third portions do not overlap and collectively combine to comprise 100% of said first biological individuality data.

5. The system of claim 4, wherein said first portion of said first biological individuality data comprises 60%, said second portion comprises 30%, and said third portion comprises 10% of said first biological individuality data.

6. The system of claim 2, wherein said authentication card authenticates itself by executing a calculation at said authentication terminal.

7. The system of claim 2, wherein said authentication device is adapted to apply authentication verification more than once by comparing multiple first biological individuality data with multiple second biological individuality data based on level differentiating information received from said authentication card, said authentication terminal, and/or said certification authority.

8. The system of claim 2, wherein said first and second biological individuality data comprise:

fingerprints, palm-prints, iris or retina patterns, DNA information, handwriting samples and/or voice prints, wherein said authentication device selects one or more fingerprints, palm-prints, iris or retina patterns, DNA information, handwriting samples and/or voice prints to verify authentication, and wherein at least one of fingerprints, palm-prints, iris or retina patterns, DNA information, handwriting samples and/or voice prints is stored in said certification authority.

9. The system of claim 8, wherein said authentication device selects said first and second biological individuality data randomly each time said authentication device compares first and second biological individuality data.

10. The system of claim 2, wherein said authentication device comprises:

an authentication card reader;

an identity acquisition unit adapted to obtain said second biological individuality data;

a judgment unit adapted to collate said second biological individuality data with said first biological individuality data read from said authentication card or obtained from said certified authority; and a display unit adapted to display a result from said judgment unit.

11. A system comprising:

an authentication card including authentication data;

an authentication terminal adapted to communicate with said authentication card, wherein said authentication terminal collects comparison data;

a certification authority adapted to communicate with said authentication terminal, wherein said certification authority also includes authentication data; and an authentication device adapted to communicate with said authentication terminal to determine a level of security and verify authentication, wherein said level of security determines a quantity of authentication and thus an amount of comparison data that must be collected and used to verify authentication, and wherein said authentication device conducts a verification of authentication based on said level of security using an effective amount of authentication data relative to said amount of comparison data collected.

12. The system of claim 11, wherein said authentication data is divided between and stored in said authentication card and said certification authority.

13. The system of claim 12, wherein said authentication data stored in said authentication card is less than 100% of said authentication data and wherein a remainder of said authentication data is stored in said certification authority.

14. The system of claim 11, further comprising a policy certification authority including authentication data, wherein a total amount of authentication data from said authentication card, certification authority and policy certification authority is 100% of said authentication data and any authentication data in said authentication card, certification authority or policy certification authority does not overlap with any authentication data in the remaining ones of the authentication card, certification authority or policy certification authority.

15. The system of claim 14, wherein said authentication card comprises 60% of said authentication data, said certification authority comprises 30% of said authentication data, and said policy certification authority comprises 10% of said authentication data.

16. The system of claim 11, wherein said authentication card and said certification authority dividedly store authentication data, wherein said authentication data comprises:

fingerprints, palm-prints, iris or retina patterns, DNA information, handwriting samples and/or voice prints, wherein said authentication device selects one or more fingerprints, palm-prints, iris or retina patterns, DNA information, handwriting samples and/or voice prints, to verify authentication, wherein at least one of fingerprints, palm-prints, iris or retina patterns, DNA information, handwriting samples and/or voice prints is stored in said certification authority.

17. The system of claim 11, wherein said authentication card verifies itself using a calculation executed by said authentication card at said authentication terminal.

18. The system of claim 2, wherein said authentication device comprises:

an authentication card reader;

an identity acquisition unit adapted to obtain said comparison data;

a judgment unit adapted to collate said comparison data with said authentication data read from said authentication card or obtained for said certified authority; and a display unit adapted to display a result from said judgment unit.

* * * * *